(12) United States Patent
Yokota

(10) Patent No.: US 8,626,171 B2
(45) Date of Patent: Jan. 7, 2014

(54) WIRELESS COMMUNICATION TERMINAL AND METHOD OF CONTROLLING THE SAME

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1052 days.

(21) Appl. No.: 12/516,783

(22) PCT Filed: Nov. 28, 2007

(86) PCT No.: PCT/JP2007/072979
§ 371 (c)(1),
(2), (4) Date: Dec. 18, 2009

(87) PCT Pub. No.: WO2008/066086
PCT Pub. Date: Jun. 5, 2008

(65) Prior Publication Data
US 2010/0142477 A1    Jun. 10, 2010

(30) Foreign Application Priority Data

Nov. 29, 2006 (JP) ................................. 2006-322419
Jan. 29, 2007 (JP) ................................. 2007-018344

(51) Int. Cl.
*H04W 36/00* (2009.01)

(52) U.S. Cl.
USPC .................... 455/442; 455/552.1; 370/331

(58) Field of Classification Search
USPC ................... 455/436–444; 370/329–336
See application file for complete search history.

(56) References Cited

U.S. PATENT DOCUMENTS

| | | | |
|---|---|---|---|
| 5,987,334 A | 11/1999 | Kaku | 455/552 |
| 6,560,210 B1 | 5/2003 | Matusevich | |
| 7,444,149 B2 * | 10/2008 | Prehofer | 455/436 |
| 7,751,819 B2 | 7/2010 | Isobe et al. | |
| 2002/0082017 A1 | 6/2002 | Hattori | 455/436 |
| 2003/0083075 A1 | 5/2003 | Miyazaki et al. | 455/456 |
| 2005/0026619 A1 | 2/2005 | Jha | 455/441 |

FOREIGN PATENT DOCUMENTS

| | | |
|---|---|---|
| JP | 07-226973 | 8/1995 |
| JP | 09-233555 | 9/1997 |
| JP | 10-108262 | 4/1998 |
| JP | 11-055717 | 2/1999 |
| JP | 2000032533 A | 1/2000 |
| JP | 2001-112044 | 4/2001 |
| JP | 2002-199428 | 7/2002 |
| JP | 2002-209246 | 7/2002 |

(Continued)

OTHER PUBLICATIONS

Japanese language office action dated Dec. 6, 2011 and its English language translation for corresponding Japanese application 2007018344.

*Primary Examiner* — Vladimir Magloire
(74) *Attorney, Agent, or Firm* — DLA Piper LLP (US)

(57) ABSTRACT

It is judged whether a mobile node 11 exists at a boundary A overlapped with a different sector of the base station for use in communication or at a boundary B overlapped with an area of another base station or at an area fringe C. In accordance with the application in use and the results thus judged, a handover is performed between base stations in a wireless communication system, or switching to the another wireless communication system is made, or simultaneous communication with the another wireless communication system is performed, or either the uplink or the downlink is switched to the another wireless communication system.

3 Claims, 18 Drawing Sheets

(56) References Cited

FOREIGN PATENT DOCUMENTS

| JP | 2003-125433 | 4/2003 |
| JP | 2003319430 A | 11/2003 |
| JP | 2004-297591 | 10/2004 |
| JP | 2006080690 A | 3/2006 |
| JP | 2006-324958 | 11/2006 |
| JP | 2007-060181 | 3/2007 |
| JP | 2007-318354 | 12/2007 |
| WO | WO 2005/013635 A1 | 2/2005 |

* cited by examiner

WIRELESS COMMUNICATION TERMINAL AND METHOD OF CONTROLLING THE SAME

CROSS-REFERENCE TO THE RELATED APPLICATIONS

This application is a national stage of international application No. PCT/JP2007/072979 filed on Nov. 28, 2009, which also claims the benefit of priority under 35 USC 119 to Japanese Patent Application No. 2006-322419 filed on Nov. 29, 2006 and Japanese Patent Application No. 2007-018344 filed on Jan. 29, 2007, the entire contents of all of which are incorporated herein by reference.

TECHNICAL HELD

The present invention relates to a wireless communication terminal and a method of controlling the same, which wireless communication terminal performs communication by a wireless communication system using a broadband and wide-area network where a base station broadcasts allocation information of downlink burst to a terminal belonging thereto by using an application having real time characteristic.

BACKGROUND ART

Conventionally, a mobile phone has a handover function for providing a user carrying the mobile phone with stable communication quality during the user moving from one place to another. Specifically, "handover" represents a technique which provides a user with stable communication quality by enabling, when a user performing communication by using a mobile phone in the same wireless communication network moves from a wireless zone of one base station to a wireless zone of another base station, the communication to be transferred smoothly in a relatively short processing time from one base station under connection to another base station to be connected.

As a result of recent progresses of wireless communication techniques, it is now possible that one wireless communication terminal has plural wireless communication devices connectable to different wireless communication networks. In a typical example of such a structure, PDA (Personal Digital Assistance), PC (Personal Computer) or a mobile phone has a first wireless communication device to be connected with a mobile phone network and a second wireless communication device to be connected with a wireless LAN station. In the handover technology, although development of techniques for allowing a mobile phone to move between base stations in a conventional single wireless communication network is in progress, handover technologies based on an environment across plural networks of different types, in a case where plural wireless communication networks of different types are present, have not been well developed yet.

Examples of handover to the same wireless network include handover between areas or sectors of a wide-area wireless network system. When a terminal moves between areas or sectors of a wide-area wireless network system, handover is normally done with respect to a base station located in a better area or sector in terms of communication. However, in a wide-area wireless network where a base station broadcasts allocation information of downlink burst to a terminal belonging thereto, it is in principle very difficult to perform satisfactory handover within the same wireless network.

As an example of handover to a wireless network of different type, there has been proposed a system using a mobile IP as shown in FIG. 15 (e.g. C. Perkins, "IP Mobility Support (RFC2002)", [online], October 1996, IETF [searched on 15 Mar., 2006], internet<URL: http://www.ietf.org/rfc/rfc2002.txt>. The basic operations of the mobile IP are as follows.

(i) A physical media, to be connected with LAN1 or LAN2 as a transfer counterpart to which communication is to be transferred, is scanned (in a case of wireless LAN, an effective wireless wave is scanned).

(ii) When a mobile node (MN) 3 enters the transfer counterpart LAN1 or LAN2, a registration request is transmitted to a home agent 6 by way of foreign agents 4, 5. The home agent 6, upon receiving the registration request, transmits an agent advertisement (data including IP address information and the like) to MN3. As a result, registration of the position of MN3 is completed.

(iii) It appears to a correspondence node 7 that the mobile node 3 is located on the home LAN 8. Therefore, the data which the correspondence node 7 wants to send is transmitted toward the home agent 6.

(iv) The home agent 6 encapsulates the data thus sent thereto with a Care of IP Address by using the information of position registration (encapsulation) and transfers the data to the foreign agents 4, 5. A protocol defined exclusively for the mobile IP is used for encapsulation.

(v) The foreign agents 4, 5 dicapsulate the capsule and transfer the data to MN3.

(vi) MN3 transmits to the correspondence node 7 the data MN3 wants to send via the internet 9.

Regarding handover between the same wireless communication network, such a handover is carried out by a system in which the uplink and the downlink are simultaneously switched in an unconditional manner.

SUMMARY OF INVENTION

Technical Problem

In a case in which a broadband wide-area wireless network is adopting the TDD system according to the OFDMA method, in order to ensure that a terminal can accurately receive data addressed thereto from a base station, it is necessary, as shown in FIG. 16, that the base station transmits by broadcast the modification method and the coding information such as Frame Control Header FCH, Downlink Map Message DL-MAP as the allocation information of the downlink, as well as the allocation information (MAP) of the resource (subchannel) of the downlink, to all of the terminals controlled by the base station.

Regarding MAP, IE (information element) of each method is prepared so that MAP can address either a communication state in which a subchannel of the data region is allocated according to PUSC (partial Used SubChannelization) method or a communication state in which a subchannel of the data region is allocated according to AMC (Advanced Modulation and Coding) method. Specifically, in PUSC method, since MCS (Modulation Coding Scheme) differs depending on each user, the number of MAP IE for allocation must correspond to the number of the users. In AMC method, since MCS differs depending on each band, the number of MAP IE for allocation must correspond to the number of bands (e.g. 24 Bands). For example, in the case of 3SDMA (Space Division Multiple Access), the maximum 72 (24 Bands×3) of MAP IE for allocation are needed.

In the IE at present (IEEE802.16e), since the allocation is rectangular and the Symbol/Subchannel number representing the starting offset and the Symbol/Subchannel number representing the range of allocation are specified respectively, the amount of information contained therein is relatively large. Further, in such an IE, since only one DIUC (Downlink Internal Usage Code) for specifying MCS can be set, the IEs of which number corresponds to the number of Bands are needed according to AMC method. However, in AMC method, the Subchannel numbers representing the starting offset value and the allocation range are fixed, respectively, and thus need not be specified. Further, the Symbol number representing the range of the AMC region is determined by AAS_DL_IE and thus need not be specified.

The frame control header FCH and DL-MAP as the allocation information of the downlink, transmitted by a broadcast as described above, are transmitted by the same wavelength band between adjacent base stations. Therefore, when a terminal exists at a boundary where areas of two base stations or two sectors overlap each other, the frame control header FCH and the allocation information of the downlink DL-MAP can no longer be received in a satisfactory manner due to interference.

Accordingly, when handover to another adjacent base station or another sector is carried out, the quality of communication significantly deteriorates and wireless link may be disconnected. The allocation information of the downlink DL-MAP is particularly important and it has been proposed to strengthen interference resistance by transmitting the allocation information of the downlink DL-MAP immediately before the handover continually in a repeated manner (DL-MAP Repetition) in order to facilitate smooth handover between the base stations as best as possible. Normally, DL-MAP is carried out by 4 to 6 times. However, in this case, there arises a disadvantage that the more DL-MAP Repetition results in the smaller downlink bandwidth.

In order to solve the problem in handover due to interference as described above, it has been proposed to divide subcarriers for use between cells or sectors. However, in this case, there arises a disadvantage that a bandwidth available to service extremely deteriorates.

In the case of TDD systems, as compared with FDD systems, it takes 300 to 500 ms to perform handover between cells even when there is no substantial interference. Therefore, in TDD systems, use of an application sensitive to delay or jitter such as VoIP application (which will be referred to as "VoIP" hereinafter) is a factor of causing deterioration in communication quality such as voice break.

In the case of a broadband wide-area wireless network according to OFDMA systems, a single area fringe is generally determined according to transmission output from a terminal, based on difference in transmission output between the base station and the terminal. Accordingly, there arises a disadvantage that the uplink communications fails, although the downlink communication is still possible, whereby communication is made impossible after all.

In a wide-area wireless network, since a terminal performs handover to another base station by using only Received Signal Strength Indicator (RSSI) as an indicator, it cannot address handover between sectors occurring at a point where RSSI is higher than a threshold value. As is understood from FIG. 17 which plots RSSI observed when handover between sectors and handover between cells occur in a wide-area wireless network, handover between sectors occurs at higher RSSI points than handover between cells does.

FIG. 18 shows a packet arrival interval in the uplink direction when handover between sectors and handover between cells occur in a wide-area wireless network, and FIG. 19 shows a packet arrival interval in the downlink direction when handover between sectors and handover between cells occur in a wide-area wireless network. In both uplink and downlink directions, the packet arrival interval tends to become larger (i.e. the instant break time of communication tends to become longer) in handover between sectors, whereby communication quality is kept poor longer, which is increasingly inconvenient in handover within the conventional same wireless network in terms of communication quality. This problem occurs because a terminal is subjected to a relatively large interference from another sector for a relatively long time at a relatively high RSSI. Conventionally, a terminal uses only RSSI as an indicator to support handover to another base station.

There has been conventionally proposed to use mobile IP to switch plural paths to a seamless state. In this case, simultaneous communication is possible only in the communication using basically a single wireless network and the system does not address simultaneous communication by plural wireless networks. Therefore, when switching (handover) to another wireless network is to be done, communication by the wireless network currently in use must be once disconnected, whereby a considerable time has to be spent for switching of communication paths and thus communication quality during communication switching is significantly deteriorated (e.g. voice break or instant power break). Further, if deterioration in downlink wireless quality is detected by a mobile node and the binding cache is renewed by binding update at a switching server after switching of the communication paths is requested with respected to the switching server, since CoA (Care of Address) is renewed, it is not possible to maintain communication by using different wireless communication networks in uplink and downlink directions, respectively.

Further, since mobile IP does not address multi-home, it is not possible to complement an insufficient bandwidth by carrying out communication using plural wireless links simultaneously.

Accordingly, in a case in which a wireless communication terminal exists at a boundary overlapped with a sector or at a boundary overlapped with an area or at an area fringe, it is desired to perform excellent communication so as to maintain wireless quality.

Further, the conventional mobile IP described above is a technique which enables, if a terminal moves between networks in an environment where plural networks are connected to each other, communication to be performed always using the same IP address. That is, the aforementioned conventional mobile IP makes it possible to perform communication by using the same IP address basically in the domestic wireless/wire LAN and the outdoor commercial wireless LAN, respectively. The handover techniques in this case are those for performing handover by using one wireless communication device, i.e. a method of switching the uplink and the downlink simultaneously to another wireless communication network of the same type.

As described above, since only a method of switching the uplink and the downlink simultaneously to another wireless communication network is available in the background art, there arise following problems:
  in some applications, due to latency required for switching thereof, communication quality may significantly deteriorate (decrease in bandwidths, temporary failure in communication etc.);
  a handover system considering policies for selecting wireless communication networks (preference to service quality, preference to communication charge, preference to communication time (battery life/continuous use time) and the like) cannot be selected;

due to imbalance in link budget between the uplink and the downlink, a link coverage area of the wireless communication network is relatively small. Specifically, among the uplink and the downlink, the link having the narrower link coverage area virtually constitutes a communicable zone, whereby the wider area of the area reached by the uplink transmission and the area reached by the downlink transmission is wasted and cannot be utilized effectively; and handover is performed, regardless of the application, although relatively large latency is generated in handover between the same wireless communication network. As a result, service quality may be significantly deteriorated.

Further, as a result of recent progress in wireless communication technology, it is now possible that a single wireless communication terminal has plural wireless communication devices (communication cards) connectable to different wireless communication networks. In a typical example of such a structure, PDA, PC or a mobile phone has a first wireless communication device to be connected with a base station of a mobile phone network and a second wireless communication device to be connected with a wireless LAN station (base stations such as home wireless LAN, WiFi, WiMAX). There has been a good progress in the handover techniques for allowing a mobile phone to move between base stations in a single wireless communication network using a wireless communication device. However, there has been a strong desire for a progress in the handover technologies between systems based on an environment across plural networks of different types.

Yet further, in what is called multi-mode terminal connectable to plural wireless communication networks, although such a terminal can be connected to plural wireless communication networks, bandwidths, communication charge, continuous communication time (the battery life) available to the terminal vary depending on the wireless communication network to be connected, respectively. Further, acceptable "allowable delay in time" and required bandwidths vary depending on the application used by a user. Accordingly, it is not appropriate to simply perform handover to a wireless network having a relatively large bandwidth or perform handover of the uplink and the downlink simultaneously to another wireless communication network, which handover is simply triggered by deterioration in the communication state at the terminal. Handover techniques considering various network environments are needed.

In view of this, an object of the present invention is to provide techniques (a wireless communication terminal and a method of controlling the same) capable of performing excellent communication so as to maintain good wireless quality at a boundary overlapped with a sector or at a boundary overlapped with an area or at an area fringe.

Further, another object of the present invention is to provide techniques (a wireless communication terminal and a method of controlling the same) capable of achieving advanced handover for selecting an optimum handover system from a plural types of handover systems in a wireless communication apparatus that are connectable to plural wireless networks.

Solution to Problem

In the present invention, a wireless communication terminal, which performs communication by one wireless communication system using a broadband and wide-area network where a base station broadcasts allocation information of downlink burst to a terminal belonging thereto by using an application having real time characteristic, comprises: a communication unit for performing communication with another wireless communication system using a wide-area network, to which network seamless handover between base stations or sectors of a base station is carried out;

a judging unit for judging, when the wireless communication terminal is performing communication by the one communication system, whether the wireless communication terminal exists at a boundary overlapped with a different sector of the base station for use in communication or at a boundary overlapped with an area of another base station or at an area fringe of the base station for use in communication not overlapped with a sector of the base station for use in communication or an area of another base station; and a control unit for controlling, according to the application in use and the results made by the judging unit, such that a handover is performed between base stations in the one wireless communication system, or switching to the another wireless communication system is made, or simultaneous communication with the another wireless communication system is performed in order to complement the communication with the one wireless communication system, or either the uplink link or the downlink is switched to the another wireless communication system.

In one embodiment of the present invention, the wireless communication terminal further comprises a detection unit for detecting a received signal strength indicator and a signal-to-noise ratio, wherein the judging unit judges, when the received signal strength indicator and the signal-to-noise ratio satisfy predetermined conditions for a predetermined period, that the wireless communication terminal exists at an area fringe of the base station for use in communication not overlapped with a sector of the base station for use in communication or an area of another base station.

In the wireless communication terminal according to another embodiment of the present invention, when the judging unit judges that the wireless communication terminal exists at an area fringe of the base station for use in communication not overlapped with a sector of the base station for use in communication or an area of another base station, the control units performs control such that either the uplink link or the downlink is switched to the another wireless communication system.

In the wireless communication terminal according to yet another embodiment of the present invention, the wireless communication terminal further comprises a detection unit for detecting communication quality and received signal strength indicator of the wireless communication terminal, wherein the judging unit judges, when the communication quality and the received signal strength indicator satisfy first conditions, that the wireless communication terminal exists at a boundary overlapped with a different sector of the base station for use in communication.

In the wireless communication terminal according to the yet another embodiment of the present invention, when the judging unit judges that the wireless communication terminal exists at a boundary overlapped with a different sector of the base station for use in communication, the control units performs control such that switching to the another wireless communication system is made.

In the wireless communication terminal according to yet another embodiment of the present invention, the judging unit judges, when the communication quality and the received signal strength indicator satisfy a second condition in which the received signal strength indicator is set lower than that in the first conditions, that the wireless communication terminal exists at a boundary overlapped with an area of another base station.

In the wireless communication terminal according to the yet another embodiment of the present invention, when the judging unit judges that the wireless communication terminal exists at a boundary overlapped with an area of another base station and the application having real time characteristic is a streaming application, the control units performs control such that a handover is performed between base stations in the wireless communication system.

In the wireless communication terminal according to the yet another embodiment of the present invention, in a case where the application having real time characteristic is a VoIP application and the judging units judges that the wireless communication terminal exists at a boundary overlapped with an area of another base station, the control units performs control such that either switching to the another wireless communication system is made or simultaneous communication with the another wireless communication system in order to complement the communication with the one wireless communication system is performed.

In yet another embodiment of the present invention, the wireless communication terminal further comprises a measuring unit for measuring difference in delay between the one wireless communication system and the another wireless communication system, wherein the control units performs control such that switching to the another wireless communication system is made when the difference in delay exceeds a threshold value.

In yet another embodiment of the present invention, the wireless communication terminal further comprises a measuring unit for measuring difference in delay between the one wireless communication system and the another wireless communication system, wherein the control units performs control such that simultaneous communication with the another wireless communication system is performed in order to complement the communication with the one wireless communication system when the difference in delay is equal to or below a threshold value.

In the foregoing descriptions, the solution to the problem in the present invention has been described as an apparatus. However, it should be understood that the present invention can also be realized by a method, a program or a memory medium recording the program, which substantially correspond to the apparatus, and the scope of the present invention include them.

For example, in yet another embodiment realizing the present invention as a method, a method of controlling a wireless communication terminal, which terminal performs communication by one wireless communication system using a broadband and wide-area network where a base station broadcasts allocation information of downlink burst to a terminal belonging thereto by using an application having real time characteristic, comprises the steps of: judging, when the wireless communication terminal is performing communication by the one communication system, whether the wireless communication terminal exists at a boundary overlapped with a different sector of the base station for use in communication or at a boundary overlapped with an area of another base station or at an area fringe of the base station for use in communication not overlapped with a sector of the base station for use in communication or an area of another base station; and controlling, according to the application in use and the results made by the judging unit, such that a handover is performed between base stations in the one wireless communication system, or switching is made to the another wireless communication system using a wide-area network performing a seamless handover between base stations or sectors of a base station, or simultaneous communication with the another wireless communication system is performed in order to complement the communication with the one wireless communication system, or either the uplink link or the downlink is switched to the another wireless communication system.

In one embodiment of the present invention, the method of controlling a wireless communication terminal further comprises the steps of: detecting a received signal strength indicator and a signal-to-noise ratio of the wireless communication terminal, judging, when the received signal strength indicator and the signal-to-noise ratio satisfy predetermined conditions for a predetermined period, that the wireless communication terminal exists at an area fringe of the base station for use in communication not overlapped with a sector of the base station for use in communication or an area of another base station.

In the method of controlling a wireless communication terminal according to yet another embodiment of the present invention, when it is judged that the wireless communication terminal exists at an area fringe of the base station for use in communication not overlapped with a sector of the base station for use in communication or an area of another base station, either the uplink link or the downlink is switched to the another wireless communication system.

In the method of controlling a wireless communication terminal according to yet another embodiment of the present invention, when communication quality and a received signal strength indicator of the wireless communication terminal are detected and the communication quality and the received signal strength indicator thus detected satisfy first condition(s), it is judged that the wireless communication terminal exists at a boundary overlapped with a different sector of the base station for use in communication.

In the method of controlling a wireless communication terminal according to yet another embodiment of the present invention, when it is judged that the wireless communication terminal exists at a boundary overlapped with a different sector of the base station for use in communication, switching to the another wireless communication system is made.

In the method of controlling a wireless communication terminal according to yet another embodiment of the present invention, when the communication quality and the received signal strength indicator satisfy a second condition in which the received signal strength indicator is set lower than that in the first condition(s), it is judged that the wireless communication terminal exists at a boundary overlapped with an area of another base station.

In the method of controlling a wireless communication terminal according to the yet another embodiment of the present invention, when it is judged that the application having real time characteristic is a streaming application and that the wireless communication terminal exists at a boundary overlapped with an area of another base station and, a handover between base stations in the one wireless communication system is performed.

In the method of controlling a wireless communication terminal according to the yet another embodiment of the present invention, in a case where the application having real time characteristic is a VoIP application and it is judged that the wireless communication terminal exists at a boundary overlapped with an area of another base station, either switching to the another wireless communication system is made or simultaneous communication with the another wireless communication system in order to complement the communication with the one wireless communication system is performed.

In yet another embodiment of the present invention, the method of controlling a wireless communication terminal further comprises the steps of measuring difference in delay between the one wireless communication system and the another wireless communication system; and switching to the another wireless communication system when the difference in delay exceeds a threshold value.

In yet another embodiment of the present invention, the method of controlling a wireless communication terminal further comprises: the steps of measuring difference in delay between the one wireless communication system and the another wireless communication system; and simultaneously performing communication with the another wireless communication system in order to complement the communication with the one wireless communication system when the difference in delay is equal to or below a threshold value.

In yet another embodiment of the present invention, the wireless communication apparatus connectable to plural wireless communication networks, comprises: a handover system selection unit for selecting one of a vertical synchronization system for performing simultaneous handover of vertical links, an up/down asynchronous system for performing asynchronous (separate or independent) handover of the vertical links (including performing handover of either the uplink or the downlink to another base station/sector in the same wireless communication network), a synchronization connection bandwidth complementary system for simultaneously connecting the terminal to another wireless communication network, while maintaining connection with one wireless communication network currently in use for communication, and performing handover to the another wireless communication network with complementing an insufficient bandwidth, and an in-the-same-network switching system for performing handover from a base station or sector currently in use for connection to another base station or sector in the same wireless communication network; and a handover control unit for controllably performing handover by using the handover system selected by the handover system selection unit.

In yet another embodiment of the present invention, the wireless communication apparatus further comprises: an operation input unit for inputting and renewing a policy (selection criterion); and a policy storing unit for storing the policy (selection criterion) regarding handover inputted by the operation input unit, wherein the handover system selection unit selects one of the handover systems on the basis of the policy stored in the policy storing unit.

In yet another embodiment of the present invention, the wireless communication apparatus further comprises another operation input unit for setting (inputting, renewing, selecting etc.) the policy.

In yet another embodiment of the present invention, the wireless communication apparatus further comprises an application information acquisition unit for acquiring, from an application in use for wireless communication, application information of allowable delay time and at least one of a necessary bandwidth of the uplink and a necessary bandwidth of the downlink, wherein the handover system selection unit selects one of the handover systems on the basis of the application information acquired by the application information acquisition unit.

In yet another embodiment of the present invention, the wireless communication apparatus further comprises: a latency storing unit for storing latency (delay in time) required for handover in each wireless communication network (i.e. between base stations/sectors of the same wireless communication network or the like) of the plural wireless communication networks, and allowable delay time prescribed for each application in use for communication; and a time comparing unit for comparing latency stored in the latency storing unit with allowable delay time of the application in use for communication, wherein the handover system selection unit selects one of the handover systems on the basis of the comparison results by the time comparing unit (e.g. whether or not the latency exceeds the allowable delay time).

Further, in yet another embodiment of the present invention, the wireless communication apparatus further comprises: a delay time measuring unit for measuring average delay time in a wireless communication network currently in use for communication; a "delay time at the wireless network to which handover is to be performed" acquisition unit (which unit will be referred to as a "handover counterpart side delay time acquisition unit" hereinafter) for acquiring average delay time in another wireless communication network as a candidate of a handover counterpart side (by measuring or reading out a measurement result stored in a storing unit in advance from the storing unit); time difference calculating unit for calculating difference in time between the average delay time measured by the delay time measuring unit and the average delay time acquired by the handover counterpart side delay time acquisition unit; and a comparison unit for comparing a time interval obtained by adding the larger average delay time of either the average delay time of the wireless communication network currently in use for communication or the average delay time of another wireless communication network as a candidate of the handover counterpart side, to the time difference calculated by the time difference calculating unit, with an allowable delay time of the application, wherein the handover system selection unit determines, in accordance with a comparison result obtained by the comparison unit, whether the synchronization connection bandwidth complementary system is to be selected or one of the other three systems to be selected.

Further, in yet another embodiment of the present invention, the wireless communication apparatus further comprises: a communication quality monitoring unit for monitoring communication quality of the uplink and the downlink of the wireless network currently in use for communication, respectively; and a communication area monitoring unit for monitoring whether or not the terminal is within an area of the another wireless communication network (the unit may also monitor whether or not the terminal is within a sector or an area of the same wireless communication network); wherein the handover system selection unit selects one of the handover systems on the basis of the monitoring results obtained by the communication quality monitoring unit and the communication area monitoring unit.

Further, in yet another embodiment of the present invention, the wireless communication apparatus further comprises: a consumed electric current value calculating unit for calculating for each wireless communication network a consumed electric current value (at least a transmission current value) consumed by communication at each wireless communication network; wherein the handover system selection unit selects one of the handover systems on the basis of each consumed electric current value calculated by the consumed electric current value calculating unit.

Further, in yet another embodiment of the present invention, wherein the consumed electric current value calculating unit calculates a consumed electric current value consumed during transmission on the basis of at least transmission output and a transmission bandwidth (e.g. the number of subcarriers according to a multicarrier communication system such as OFDMA).

Further, in yet another embodiment of the present invention, a method of controlling a wireless communication apparatus connectable to plural wireless communication networks, comprises the steps of: selecting a handover system from a vertical synchronization system for performing simultaneous handover of vertical links by using a calculation unit (a process such as CPU, DSP or the like), an up/down asynchronous system for performing asynchronous (separate or independent) handover of the vertical links (including performing handover of either the uplink or the downlink to another base station/sector in the same wireless communication network), a synchronization connection bandwidth complementary system for simultaneously connecting the terminal to another wireless communication network, while maintaining connection with one wireless communication network currently in use for communication, and performing handover to the another wireless communication network with complementing an insufficient bandwidth, and an in-the-same-network switching system for performing handover from a base station or sector currently in use for connection to another base station or sector in the same wireless communication network; and controllably performing handover by using the handover system thus selected.

Advantageous Effects on Invention

According to the present invention, it is judged whether a wireless communication terminal exists at a boundary overlapped with a different sector of the base station for use in communication or at a boundary overlapped with an area of another base station or at an area fringe of the base station for use in communication not overlapped with a sector of the base station for use in communication or an area of another base station. Then, in accordance with the application in use and the results of the judgment, a control unit performs handover between base stations in one wireless communication system using a broadband and wide-area network where a base station broadcasts allocation information of downlink burst to a terminal belonging thereto, or switches to another wireless communication system, or performs simultaneous communication with another wireless communication system using a wide-area network where seamless handover is carried out between base stations or sectors of a base station, or switches either the uplink or the downlink to the another wireless communication system. By performing such a control as described above in accordance with the application and the judgment results, it is possible to carry out good communication and maintain good wireless quality at a boundary overlapped with a different sector or at a boundary overlapped with an area of another base station or at an area fringe.

DESCRIPTION OF EMBODIMENTS

Figure 1:
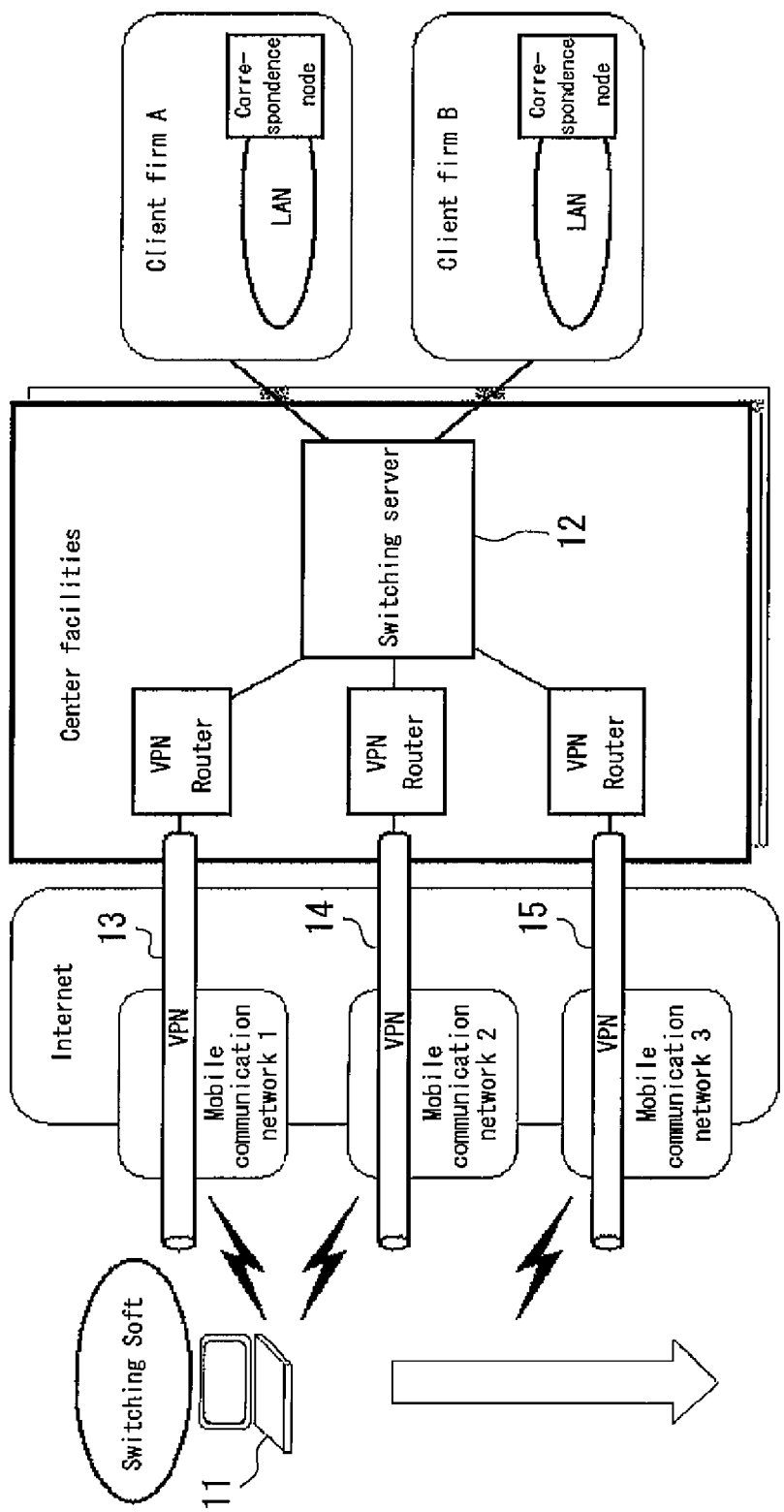
FIG. 1 is a structural view of a system where a wireless communication terminal according to a first embodiment of the present invention is used.

Embodiments of a wireless communication terminal and a method of controlling the wireless communication terminal of the present invention will be described in detail with reference to drawings.
<Embodiment 1>
FIG. 1 is a structural view of a system where a wireless communication terminal according to a first embodiment of the present invention is used. In the system as shown in FIG. 1, virtualization of L3 is realized and IP mobility is established by establishing a tunnel by VPN (IPSec) 13, 14, 15 between MN 11 and a switching server 12. As a result, different from mobile IP, communication can be performed between MN 11 and SS 12 by simultaneously using plural wireless communication networks. That is, communication can be performed using different wireless communication networks in the wireless up/downlinks.
In FIG. 1, MN 11 has a unit for detecting deterioration in communication quality in the downlink wireless link and a unit for detecting silence in the uplink sound. SS 12 has a unit for detecting deterioration in communication quality in the wireless uplink and a unit for detecting silence in the downlink sound. Due to this, when MN 11 detects deterioration in communication quality in the wireless downlink, the communication path of the wireless downlink is switched to another different communication path after SS 12 detects silence in the downlink sound and then the communication path of the wireless uplink is switched to another different communication path after MN 11 detects silence in the uplink sound. As a result, deterioration in communication quality such as voice break and instant power break due to switching of the communication paths can be prevented.

On the other hand, when SS12 detects deterioration in communication quality in the wireless uplink, the communication path of the wireless uplink is switched to another different communication path after MN11 detects silence in the uplink sound and then the communication path of the wireless downlink is switched to another different communication path after SS12 detects silence in the downlink sound. As a result, deterioration in communication quality such as voice break and instant power break due to switching of the communication paths can be prevented.

Further, by switching the uplink and the downlink independently to the codec which is the most suitable to the features (bandwidth, delay, jitter and the like) of the wireless up/downlink in the aforementioned switching of communication paths when silence is detected, it is possible to improve communication quality after switching of communication paths and prevent noises in switching of codec.

In a case in which MN 11 has plural wireless communication units, it is not preferable to maintain all of the communication paths in a communication-on state in terms of saving a battery of MN 11. Therefore, when deterioration in communication quality is detected by MN 11 and SS12 as described above, there is a threshold value for each different communication path as a candidate to which switching will be carried out by the two-stage switching. As a result, by first shifting different communication units from a dormant or power-off state to a communication-on state according to a first threshold value and performing communication of predetermined control messages by MN11 and SS12, it is possible to check the communication state of the communication paths as the switching candidates and determine the communication path to which switching is to be carried out.

Thereafter, by performing switching to another communication path thus determined when the threshold value of deterioration in communication quality at MN 11 or SS12 has reached a second threshold value, switching to another communication path can be realized with achieving battery saving of M11 but without deterioration of communication quality.

Figure 2:
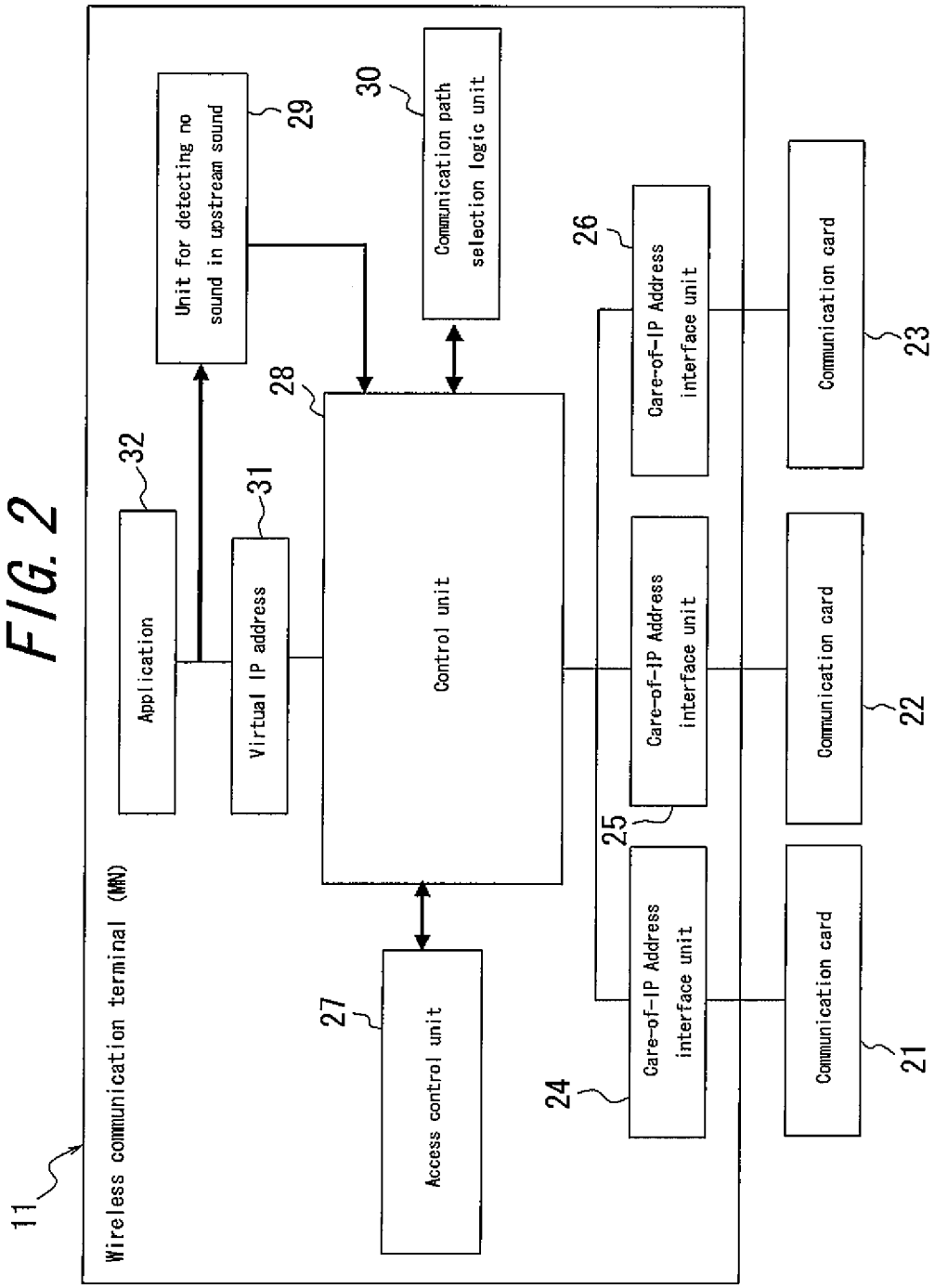
FIG. 2 is a block diagram of a MN.
Figure 3:
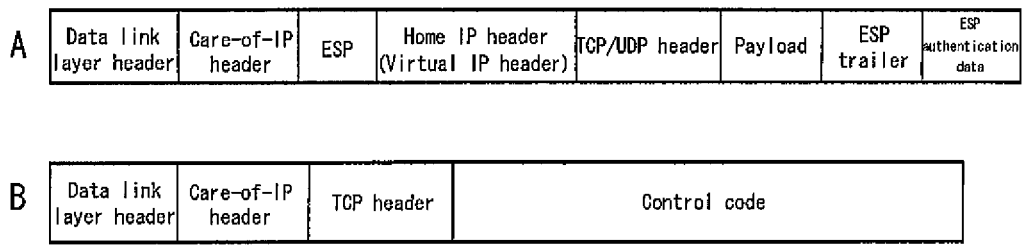
FIG. 3 is a diagram showing a frame format.

FIG. 2 is a block diagram of MN. FIG. 3 is a diagram showing a frame format. In FIG. 3, "A" represents a frame format of a data packet on the MN side and "B" represents a frame format of an access control packet on the MN side. In FIG. 2, MN11 has a Care-of-IP-Address interface units 24, 25, 26 to which communication cards 21, 22, 23 are connected, an access control unit 27, a control unit 28, a unit 29 for detecting silence in the uplink sound, a communication path selection logic unit 30, a virtual IP address 31, and an application 32.

The access control unit 27, independent of the normal data communication between MN11 and SS12, controls an echo back of control packets in switching the communication interfaces and/or between MN11 and SS12. An echo back is carried out in a communication path where communication is not performed at present. By monitoring packet reception intervals by MN11 and SS12, respectively, a communication state is checked. The result thereof is used by the communication path selection logic unit 30 to determine to which communication path switching is to be carried out.

The control unit 28 has a processing unit for matching received packets, a processing unit for analyzing wireless information, and a processing unit for analyzing received packets. The processing unit for matching received packets realizes a function of jitter buffer and matches the order of packets received from two or more mobile communication networks. In a case of a real-time application such as VoIP, the sequence number of RTP (Real-time transport protocol) is checked.

The processing unit for analyzing wireless information analyzes wireless information which MN11 received in mobile communication in a communication-on state e.g. throughput, SINR, RSSI, DRC, Tx_Power) and the analysis result is used for detecting deterioration in communication quality in the wireless downlink. The processing unit for analyzing received packets analyzes the statistic information of data packets received by MN 11 (throughput, packet loss, underrun count, overrun count). Then, in a case of a communication path currently in use for communication, the processing unit for analyzing received packets can judge whether or not the communication quality has been deteriorated. In a case of a communication path currently not in use for communication, the communication state is checked and the processing unit for analyzing received packets can judge whether or not the communication path is to be switched.

The unit 29 for detecting silence in the uplink sound detects that the uplink sound is silence prior to encoding to the RTP packet of VoIP. Due to this, the uplink communication path can be switched when silence is detected therein. The communication path selection logic unit 30 makes judgment on whether or not the communication path is to be switched to another communication path and judgment on, when the communication path is to be switched to another communication path, to which communication path the switching is to be performed.

Regarding the application 32 of MN11, IP mobility is ensured by providing the application 32 with the same IP address permanently, if a network of the mobile communication to which MN 11 is connected is changed, by using a virtual IP address 31 (hope IP address). Further, regarding different mobile communications, Care-of-IP-Address CoA corresponding to the respective mobile communications are possessed (in many cases, Care-of-IP-Address is provided from each mobile network when MN 11 is connected to the mobile communication network).

At SS12, it can be known through which communication path the transmission was made by seeing the Care-of-IP-Address. Further, at SS 12, IP mobility is ensured by: setting, after decapsulating capsules 13, 14, 15 of VPN, the address of the correspondence node CN as the destination address by using the home IP address of the data packet as shown in FIG. 3 (this is actually a virtual IP address 31 exclusively used by the application 32 of MN 11) as the source address; and transmitting payload to CN. Accordingly, it is possible for SS 12 to perform transmission to MN by using plural communication paths.

Further, at MN11, it is possible to receive packets transmitted by SS 12 via a communication path different from the communication path by which MN11 performed transmission. Since it suffices that the packets received from SS 12 are transmitted (inputted) with respect to the home IP address exclusively used by the application 32 of MN 11 in the packets which have been subjected to decapsulation of VPN, it does not matter through which communication path SS12 has made transmission. In other words, through whichever communication path SS 12 has transmitted packets. The packets can be transmitted (inputted) to the application 32 of MN 11.

Accordingly, at either MN 11 or SS 12, packets received from plural communication paths, through whichever communication path these packets are received, are adapted to a frame of the same format after decapsulation of VPN. Therefore, in a case where different communication paths are used for the uplink and the downlink, communication can be maintained if only the matching of the received packets is ensured.

Figure 4:
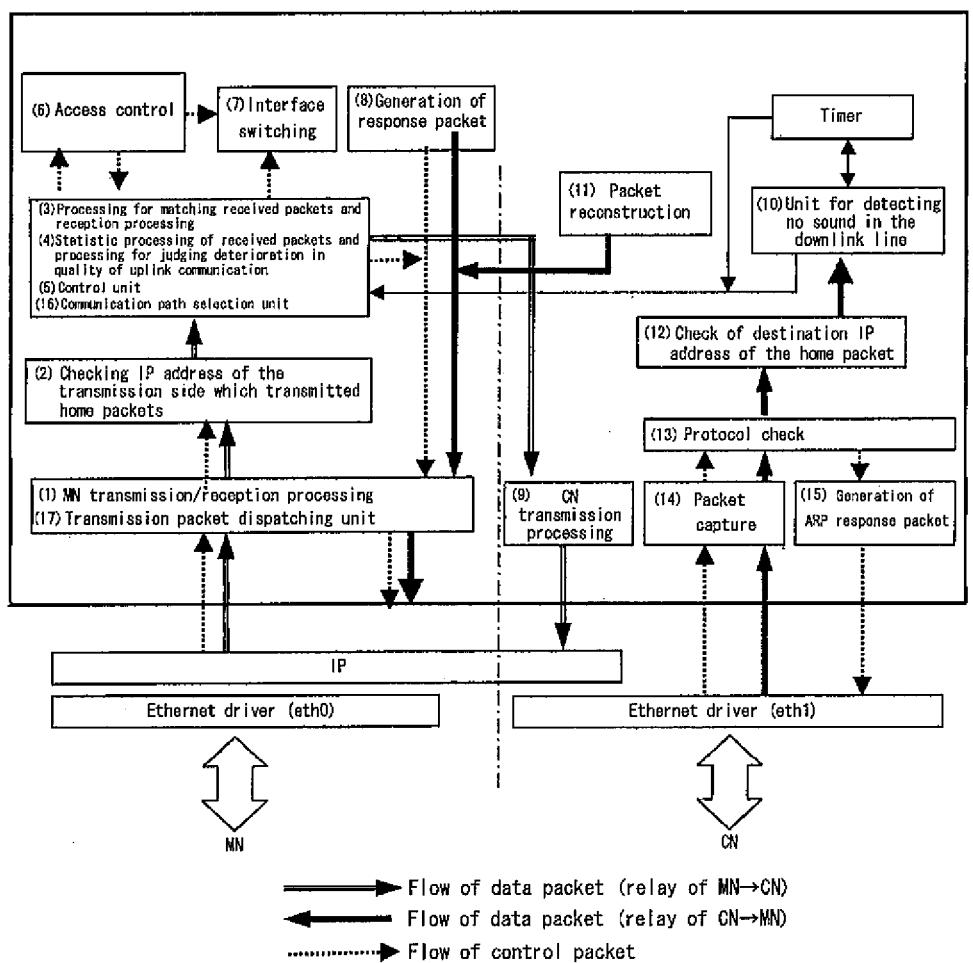
FIG. 4 is a functional block diagram of SS.

FIG. 4 is a functional block diagram of SS. In this functional block, following processes are carried out.

(1) MN Transmission/Reception Processing

Since a data packet transmitted from MN 11 is constituted in a tunnel mode format of IPSec as shown in FIG. 3A, a socket is formed according to a data program format and transmission to/reception from MN 11 is carried out. Since the access control packet is controlled by a TCP protocol, transmission/reception processing to/from MN 11 is carried out according to a format as shown in FIG. 3B.

(2) Checking the IP Address of the Transmission Side which Transmitted the Home Packets The home IP address of a data packet transmitted from MN 11 is compared with the home IP address registered in SS 12. The home IP address represents the virtual IP address 31 of MN 11, which address is notified from MN 11 to SS 12 during the first initialization procedures between MN 11 and SS 12.

(3) Processing for Matching Received Packets and Reception Processing

The jitter buffer is made to carry out the function thereof and the order of packets received from two or more mobile communication networks is matched. In a case of a real-time application such as VoIP, the sequence number of RTP is checked.

(4) Statistic Processing of Received Packets and Reception Processing

Statistic information of the data packets (packet loss, throughput, underrun count, overrun count and packet arrival interval) is acquired, whereby deterioration in the uplink communication quality is detected.

(5) Control Unit

The control unit performs the overall control of SS 12.

(6) Access Control

An access control packet transmitted from MN 11 is processed according to the control code. Table 1 shows the access control packets from MN 11 to SS 12 and Table 2 shows the access control packets from SS 12 to MN 11. The first one bite at the front end of the payload portion represents a control code. The four bites of the access control code language include the home IP address. When an access control packet is transmitted to SS 12, SS 12 transmits a response packet to MN 11 after performing a control processing.

TABLE 1

Access control packet from MN 11 to SS 12

| Title | Control code | Content of processing |
| --- | --- | --- |
| Detection of deterioration in communication quality | 0 × 11 | SS 12 is notified that MN 11 has detected deterioration at level 1 (a first threshold value) in communication quality. |
| Instruction to change communication path | 0 × 22 | On the basis that MN 11 has detected deterioration at level 2 in communication quality, MN 11 commands SS 12 to switch the communication path to a new communication path to be switched to (the communication path of the wireless downlink is switched). |
| Request for Copy reply | 0 × 31 | A request for Copy reply is transmitted from MN 11 to SS 12 in the control code 0 × 32 and by a predetermined payload. |
| Response to the Instruction to change communication path | 0 × 28 | A response to the instruction from SS 12 to change communication interface |
| Response to the Detection of deterioration in communication quality | 0 × 15 | A response to the detection of deterioration in communication quality from SS 12 |

TABLE 2

Access control packet from SS 12 to MN 11

| Title | Control code | Content of processing • |
| --- | --- | --- |
| Response to the Instruction to change communication path | 0 × 24 | A response to the instruction from MN 11 to change communication interface |
| Request for Copy reply | 0 × 32 | A response to the control code 0 × 31 |
| Detection of deterioration in communication quality | 0 × 14 | MN 11 is notified that SS 12 has detected deterioration at level 1 (a first threshold value) in communication quality. Upon receiving this message, MN 11 shifts a new different communication path to a communication-on state, transmits a request for Copy reply to SS 12 to perform check of the communication state. |
| Instruction to change communication path | 0 × 26 | On the basis that SS12 has detected deterioration at level 2 (a second threshold value) in communication quality, SS 12 commands MN 11 to switch the communication path to a new communication path to be switched to (the communication path of the wireless uplink is switched). |
| Response to the Detection of deterioration in communication quality | 0 × 12 | A response to the detection of deterioration in communication quality from MN 11 |

(7) Interface Switching

The MN carrier IP address matched to the home IP address registered in SS 12 is rewritten.

(8) Generation of Response Packet

A response packet when access control is performed is generated. The response packet is constituted of the control codes in Table 2 and a copy of the payload portion of the access control packet.

(9) CN Transmission Processing

The home packet transmitted from MN 11 is transmitted to CN. Since the home packet is constituted of IP packet, the socket is formed by an IP layer.

(10) Unit for Detecting Silence in the Downlink

Silence detection in the downlink is carried out by statistically processing the arrival intervals of packets received from CN.

(11) Packet Reconstruction

The home packet transmitted from CN is used as payload when transmission is made to MN 11.

(12) Check of Destination IP Address of the Home Packet

The destination IP address of the home packet sent from CN is compared with the home IP address registered in SS 12. Based thereon, it is judged to the carrier IP address of which MN 11 the home packet belongs.

(13) Protocol Check

The Ethernet® driver (eth1) on the CN side receives a packet by a data link layer. Among the packets received by the data link layer, only an IP packet having the home IP address as the destination and ARP (address resolution protocol) need be received by SS 12. The protocol is determined by referring to the protocol type in the header of the data link layer of the received packet.

(14) Packet Capture

At SS 12, all of the data packets can be received by binding the socket to the MAC address of the data link layer. Due to this, data including the data link layer header is received.

(15) Generation of ARP Response Packet

SS 12 responds to the ARP request with respect to all of the registered home IP addresses by using the MAC address of SS 12. Due to this, all of the home packets each having the home IP address as the destination from CN can be received at SS 12.

(16) Communication Path Selection Unit

After deterioration of communication quality in the uplink currently in use for communication is detected, a communication state of each of other plural communication paths is checked by echo back of a control message between SS 12 and MN 11, and then a downlink communication path to be switched thereto is determined.

(17) Transmission Packet Dispatching Unit

Packets to be transmitted or transmission packets are dispatched to the communication selected by SS 12. Since the tunnel format (IP address, in particular) of VPN 13, 14, 15 varies for each communication, a frame for the selected communication path is structured.

Figure 5:
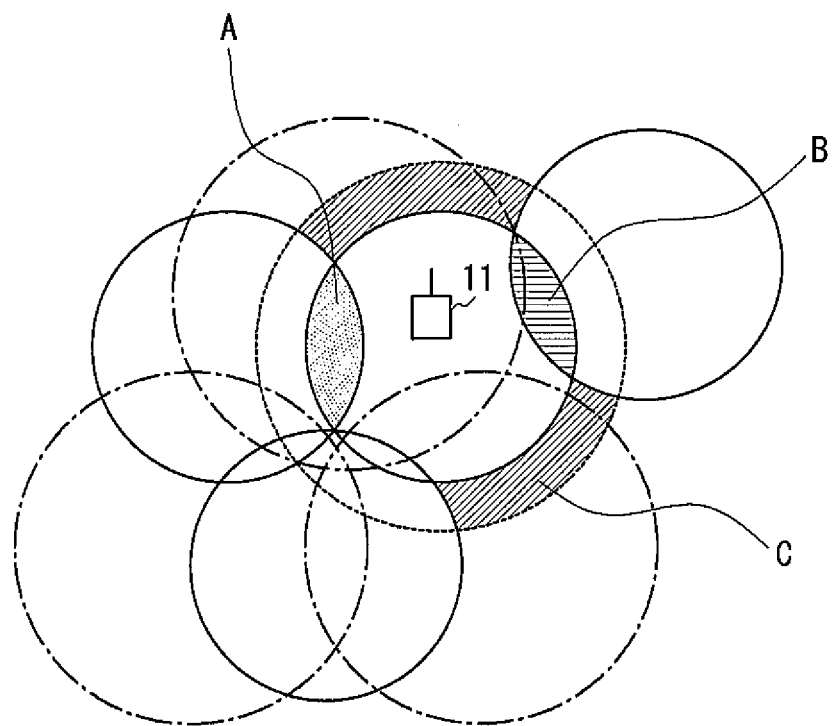
FIG. 5 is a diagram for explaining an operation of a wireless communication terminal according to the first embodiment of the present invention.

FIG. 5 is a diagram for explaining an operation of a wireless communication terminal according to a first embodiment of the present invention. In FIG. 5, each circle of solid link represents an area of each base station of a first broadband and wide-area wireless network where the base station broadcasts allocation information of downlink burst to a terminal belonging thereto by using an application having real time characteristic, and each circle of one-dotted link represents an area of each base station of a second wide-area wireless network performing a seamless handover between base stations or sectors of a base station. The boundary A overlapped with a different sector of the base station currently in use for communication is an area where the wireless state is deteriorated due to overlapping of two sectors of the first wireless network. The boundary B overlapped with an area of another base station is an area where the wireless state is deteriorated due to overlapping of areas of two base stations of the first wireless network. The air fringe C of the base station currently in use for communication, not overlapped with another sector of the base station currently in use for communication or an area of another base station, is an area where communication is not possible in the uplink but is possible in the downlink and a second wireless network is available. It should be noted that an area of the second wireless network is not limited to the arrangement of FIG. 5 and is arranged such that all necessary areas are covered. FIG. 5 does not show the entire arrangement thereof.

In the case shown in FIG. 5, MN 11, in order to realize a broadband as a broadband wireless network system, not only performs communication with one wireless communication system using the first wireless network but also performs communication with another wireless communication system using the second wireless network by using the application 32 having real time characteristic.

The first wireless network is set, for example, as a broadband and wide-area wireless network adopting OFDMA/TDD system such as WiMax, so that the link information such as the uplink/downlink subchannel, the modification system and the coding information is transmitted at each base station to all of the terminals belonging thereto as a broadcast message.

The second wireless network is set as a wireless network performing a seamless handover between areas of base stations and sectors of a base station. Examples of such a network include CDMA2000 1x EV-DO system.

The wireless information analyzing unit of MN 11 periodically measures and acquires RSSI, CIR (carrier to interference power ratio) and SNR (signal to noise ratio) and periodically measures difference in delay between the first wireless network and the second wireless network.

Figure 6:
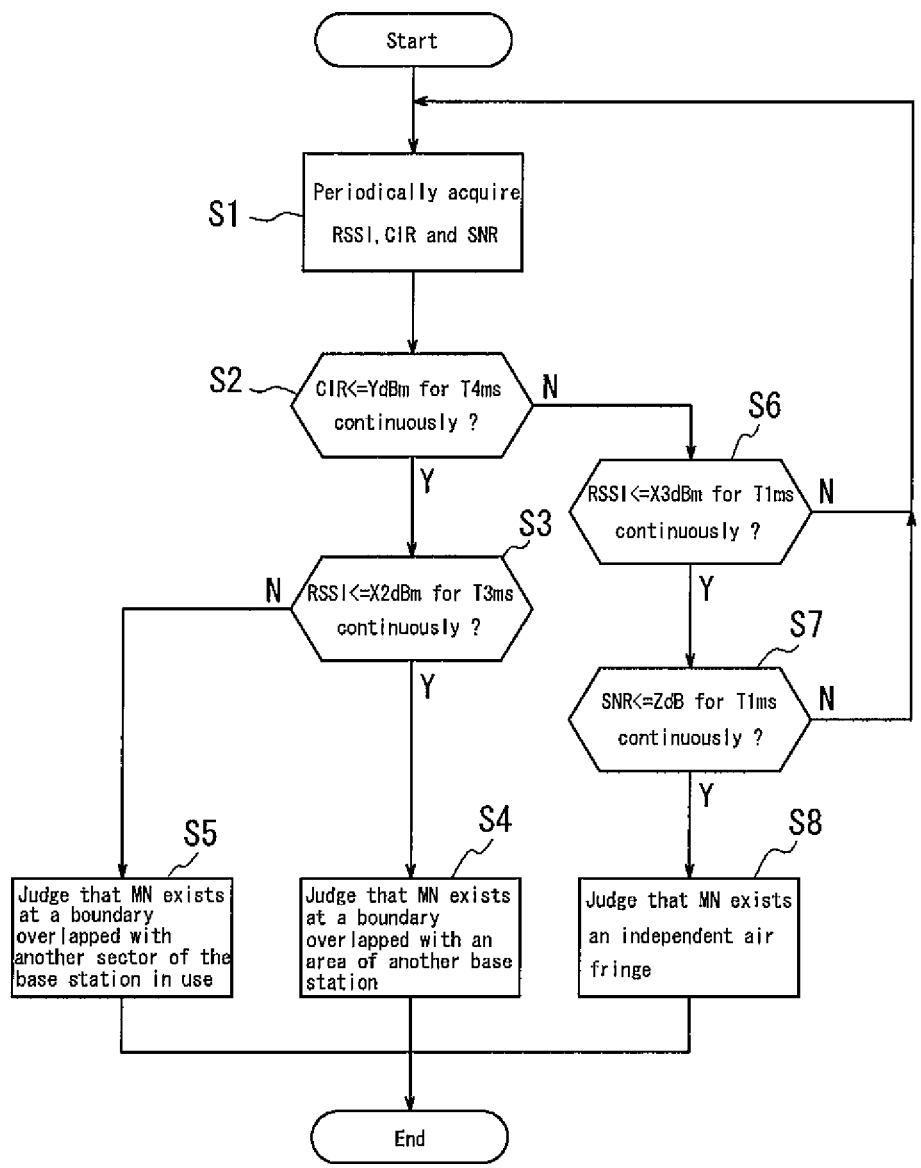
FIG. 6 is a flow chart of a boundary judgment process at MN.

FIG. 6 is a flow chart of the boundary judging process at MN. In this routine, MN 11 first periodically measures and acquires RSSI, CIR and SNR during communication via the first wireless network (Step S1). When a cell or a sector of the first wireless network is overlapped, CIR is decreased due to interference and it is checked whether or not CIR is equal to or below the threshold value YdB (Step S2). In the present embodiment, it is judged whether or not CIR is continuously equal to or below YdB for a predetermined time (T4 ms interval). However, it is acceptable to judge whether or not the average of CIR in a predetermined time (T5 ms interval) is equal to or below YdB.

In a case where it is judged that CIR is equal to or below YdB, since this represents detection that the interference from another sector or cell has reached an unignorable level, it is then judged whether it is deterioration of CIR due to interference by another sector or deterioration of CIR due to interference by a cell of another base station.

Figure 17:
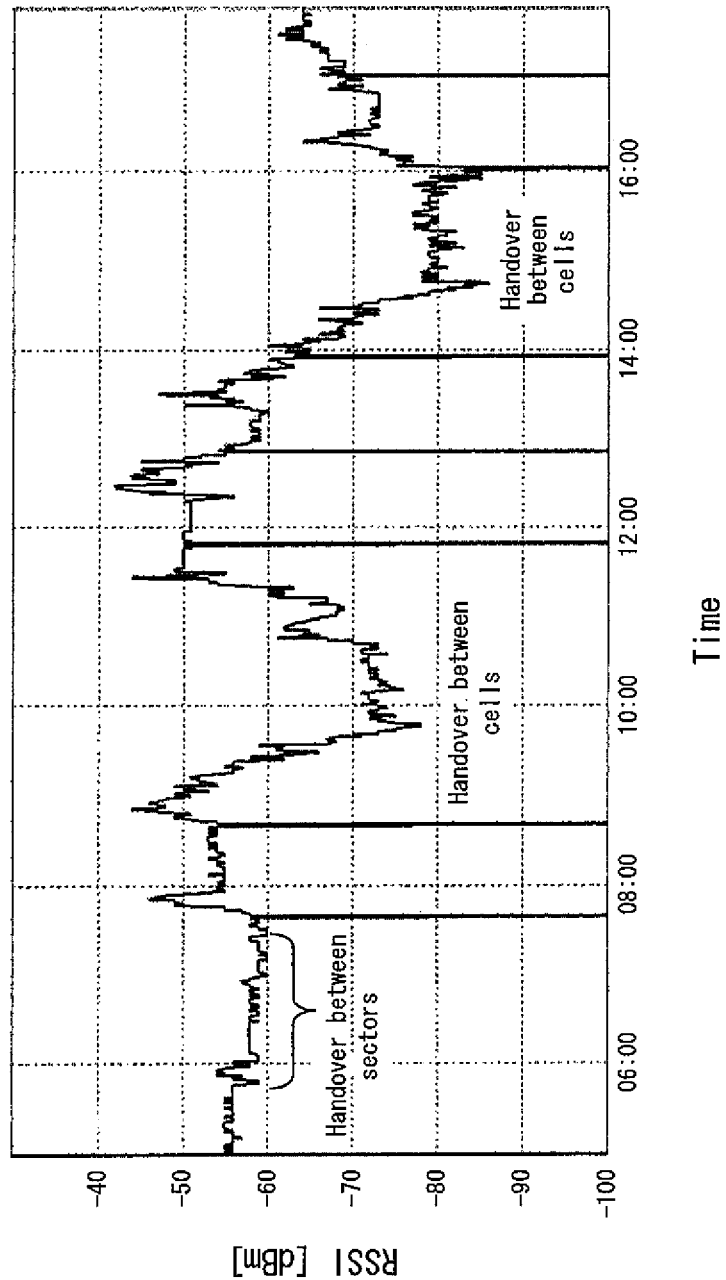
FIG. 17 is a graph showing a wireless wave state in a handover at a wireless communication terminal.
Figure 18:
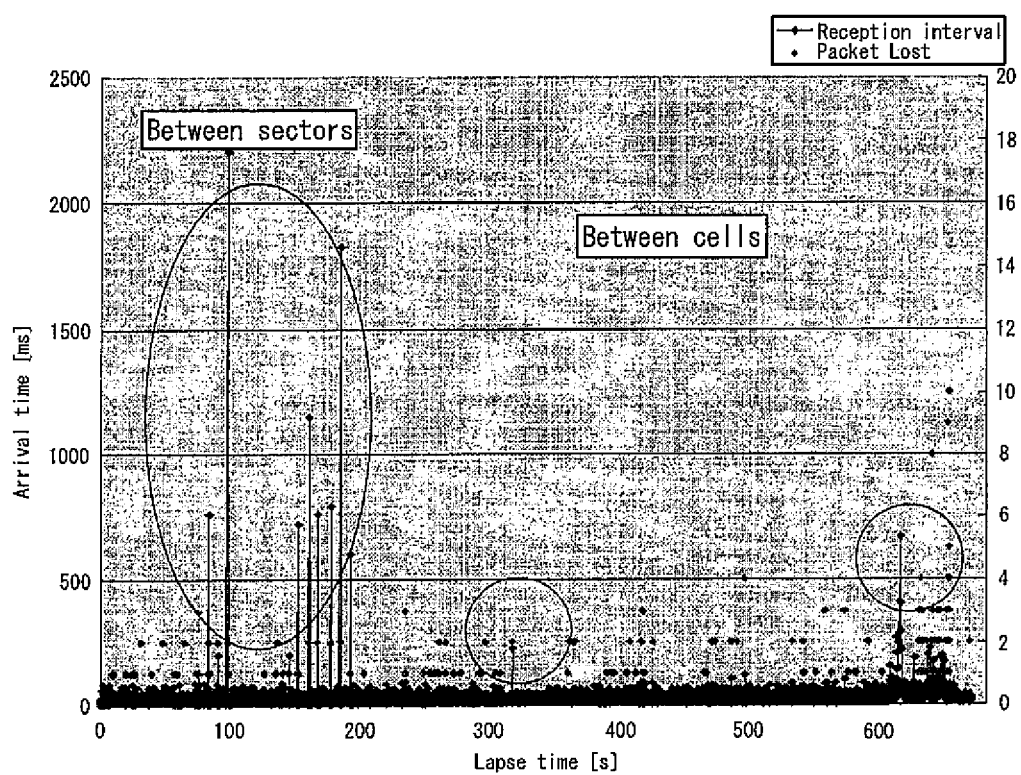
FIG. 18 is a graph showing packet arrival interval in the uplink direction when handover between sectors and handover between cells occur in a wide-area wireless network.
Figure 19:
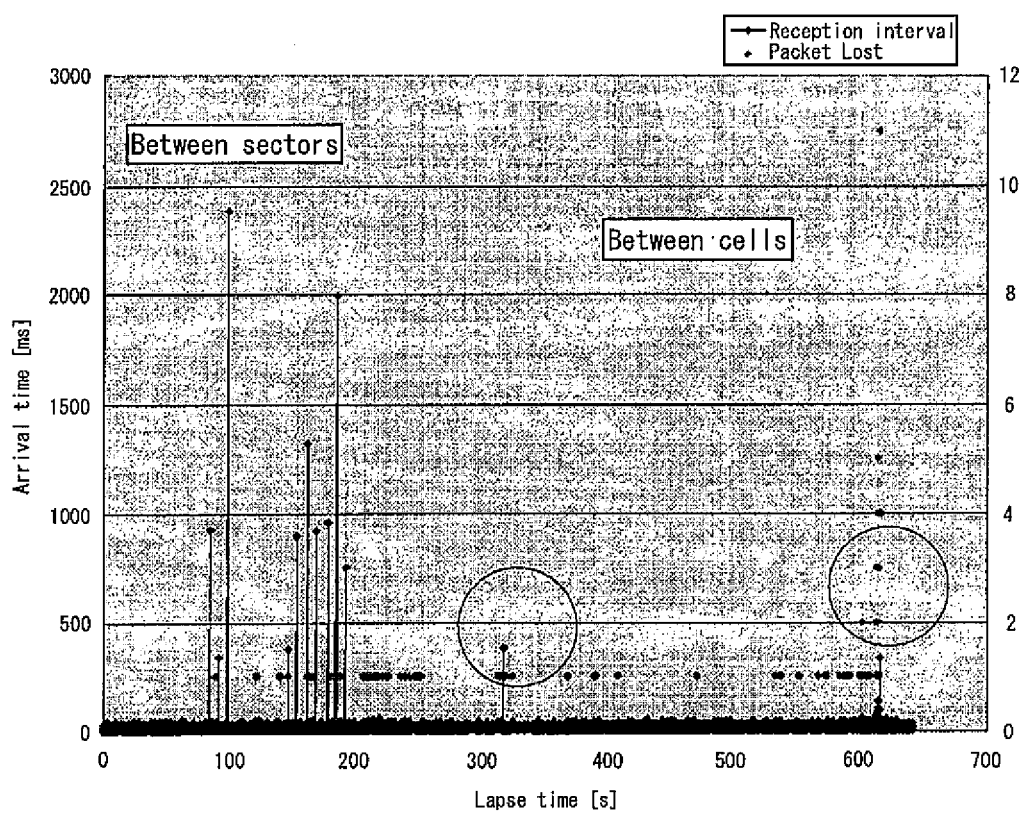
FIG. 19 is a graph showing packet arrival interval in the downsteam direction when handover between sectors and handover between cells occur in a wide-area wireless network.

As shown in FIG. 17, deterioration in CIR due to interference by another sector occurs at relatively high RSSI, as compared with deterioration in CIR due to interference by a cell of another base station. Therefore, it is judged whether or not RSSI is continuously equal to or below X2 dB for a predetermined time (T3 ms interval) (Step S3). This judgment may be carried out by judging whether or not the average of RSSI in a predetermined time (T6 ms interval) is equal to or below X2 dB.

When RSSI is equal to or below X2 dB, it is judged that deterioration of CIR due to interference by another base station has occurred, i.e. MN 11 exists at the boundary B overlapped with an area of another base station (Step S4) and the routine is completed. In contrast, when RSSI exceeds X2 dB, it is judged that deterioration of CIR due to interference by another sector of the base station has occurred, i.e. MN 11 exists at the boundary A overlapped with another sector of the base station in use for communication (Step S5) and the routine is completed.

When it is judged that CIR exceeds the threshold value YdB at Step S2, then it is judged whether or not RSSI is continuously equal to or below X3 dBm for T1 ms (Step S6). In a case where RSSI is continuously equal to or below X3 dBm for T1 ms, then it is judged whether or not SNR is continuously equal to or below ZdB for T1 ms (Step S7). In a case where it is judged that SNR is continuously equal to or below ZdB for T1 ms, it is judged that MN 11 exists at the air fringe C (Step S8) and the routine is completed.

In a case where it is judged that RSSI continuously exceeds X3 dBm for T1 ms at Step S6 or a case where it is judged that SNR continuously exceeds ZdB for T1 ms at Step S7, then it is judged that MN 11 does not exist at any of the boundary A, the boundary B and the air fringe C, whereby the procedure returns to Step S1.

In a case where MN 11 exists at the boundary B, time in which communication quality is poor is relatively short, as compared with the case where MN 11 exists at the boundary A. Therefore, when an application is used which is a real-time application but can cover a communication disconnection state by a relatively large buffer such as a streaming application (which will occasionally be referred to as "streaming" hereinafter), handover between base stations is performed within the first wireless network system.

In an application such as VoIP which does not require so broad a bandwidth but requires very high degree of real time characteristic, the service quality of the application is maintained by selecting one of: a first method of performing handover to a second wireless network as another wireless network of the same base station where handoff is smoothly carried out; and a second method of performing simultaneous communication via a first wireless network and a second wireless network and complementing an insufficient bandwidth in the first wireless network with the second wireless network. In the second method of carrying out communication by simultaneously using the first wireless network and the second wireless network, specifically, MN 11 and SS 12 transmits/receives packets by using the first wireless network as the primary path and, when a bandwidth (transfer rate) of the primary path is insufficient, the insufficient bandwidth is complemented by a slave path by using the second wireless network as the slave path. The slave path is not limited to one of networks corresponding to the second wireless network, and available plural wireless networks can be simultaneously used as the slave path.

In a case of service such as VoIP which is susceptible to an influence of delay time and/or jitter and requires a relatively small bandwidth, the second wireless network suffices in terms of bandwidth. Therefore, In judging which of the first wireless network and the second wireless network is to be selected, the average difference in delay of the first wireless network and the second wireless network is considered. Specifically, in a case where the difference in delay exceeds a certain threshold value (Pms), the first method is more suitable than the second method because in this case the second method would require jitter buffer to be increased larger than the allowable level due to difference in delay between the first wireless network and the second wireless network and/or cause communication quality to deteriorate due to failure in complementing an insufficient bandwidth in real time.

In contrast, in a case where the difference in delay is equal to or below the allowable level or the threshold value (Pms), since a bandwidth required for VoIP can always be supplied from the first wireless network and the second wireless network, the second method is more suitable than the first method in terms of voice quality. However, in both cases above, the first method may be selected in terms of saving battery of the terminal or depending on the contract forms of the first and second wireless networks.

In a case where MN 11 exists at the boundary A, since the poor communication-quality state continues longer than a case where MN 11 exists at the boundary B, the first method is carried out to maintain communication quality regardless of the type of the application. In a case such as streaming where the application is using a bandwidth larger than a bandwidth which can be supplied by the second wireless network, MN 11 notifies the application of CN (correspondence node, including SS 12), of a bandwidth which can be realized. Upon this notification, CN drops the bandwidth to the notified realizable bandwidth as smoothly as possible and carries out the application.

Further, in a case of a dual-direction and real-time application such as VoIP, at MN 11 and CN, codec is changed to what matches the bandwidth realizable in the second wireless network or, if codec of VBR (variable bit rate) is in use, the bit rate is changed to an appropriate bit rate, whereby communication sound quality is maintained. In a case where such a function is not loaded in CN, SS 12 negotiates with MN 11 to make changes of codec or appropriate changes in VBR. In this case, since use of SIP protocol would require a considerable time, a unique control protocol is used between SS12 and MN 11.

After performing handover to the second wireless network, MN 11 periodically measures CIR in the first wireless network When CIR is equal to or above QdBm (QdB>YdB), MN 11 again performs handover to the first wireless network.

In a case in which an insufficient bandwidth is complemented in order to ensure the quality of the application, it is generally assumed that an insufficient bandwidth in the second wireless network is complemented by the first wireless network. However, when a subchannel method FUSC (fully subchannelization) where available subcarriers are assigned to all of the sectors so that a user can enjoy a wide-area service is employed, since a communication state of the first wireless network significantly deteriorates at the boundary A and the boundary B due to interference, an insufficient bandwidth in the first wireless network is complemented by the second wireless, so that the quality of the application is maintained at a satisfactory level.

In the present embodiment, there is carried out a third method in which only the wireless link of which communication quality has been deteriorated is switched to the second wireless network and the other link continues to be used in the first wireless network, i.e. either the uplink or the downlink is switched to the second wireless network as another wireless network of the same base station where handoff is smoothly carried out.

The air fringe C has a characteristic that the downlink communication thereof is good, while the quality of the uplink communication significantly deteriorates. Accordingly, in the case of the air fringe C, communication is performed by the second wireless network for the uplink, while communication is continued by the first wireless network for the downlink by the third method. As a result, an apparent area of the first wireless network is extended.

Figure 7:
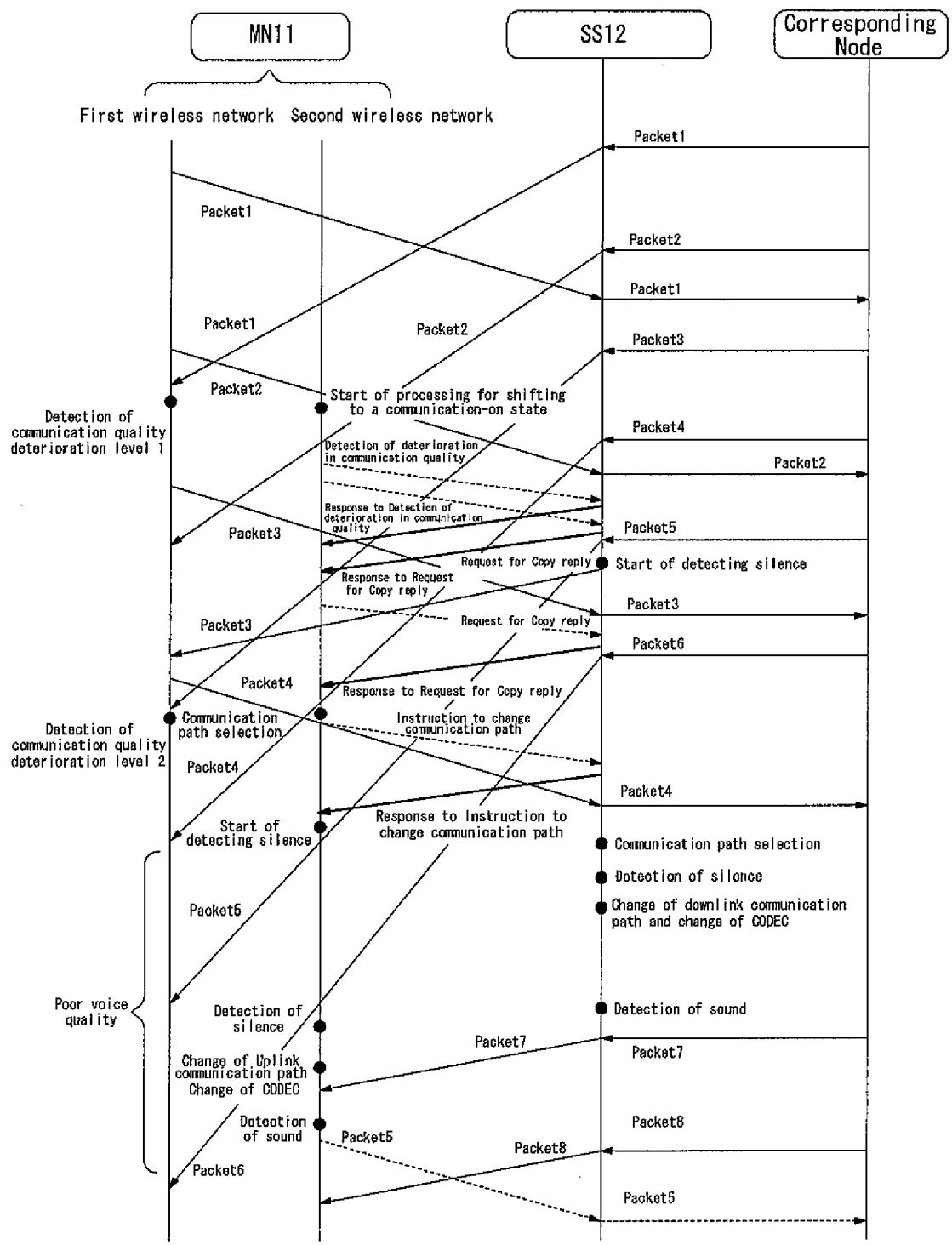
FIG. 7 is a diagram representing a case where deterioration in communication quality is detected by MN during communication via a first wireless network.
Figure 8:
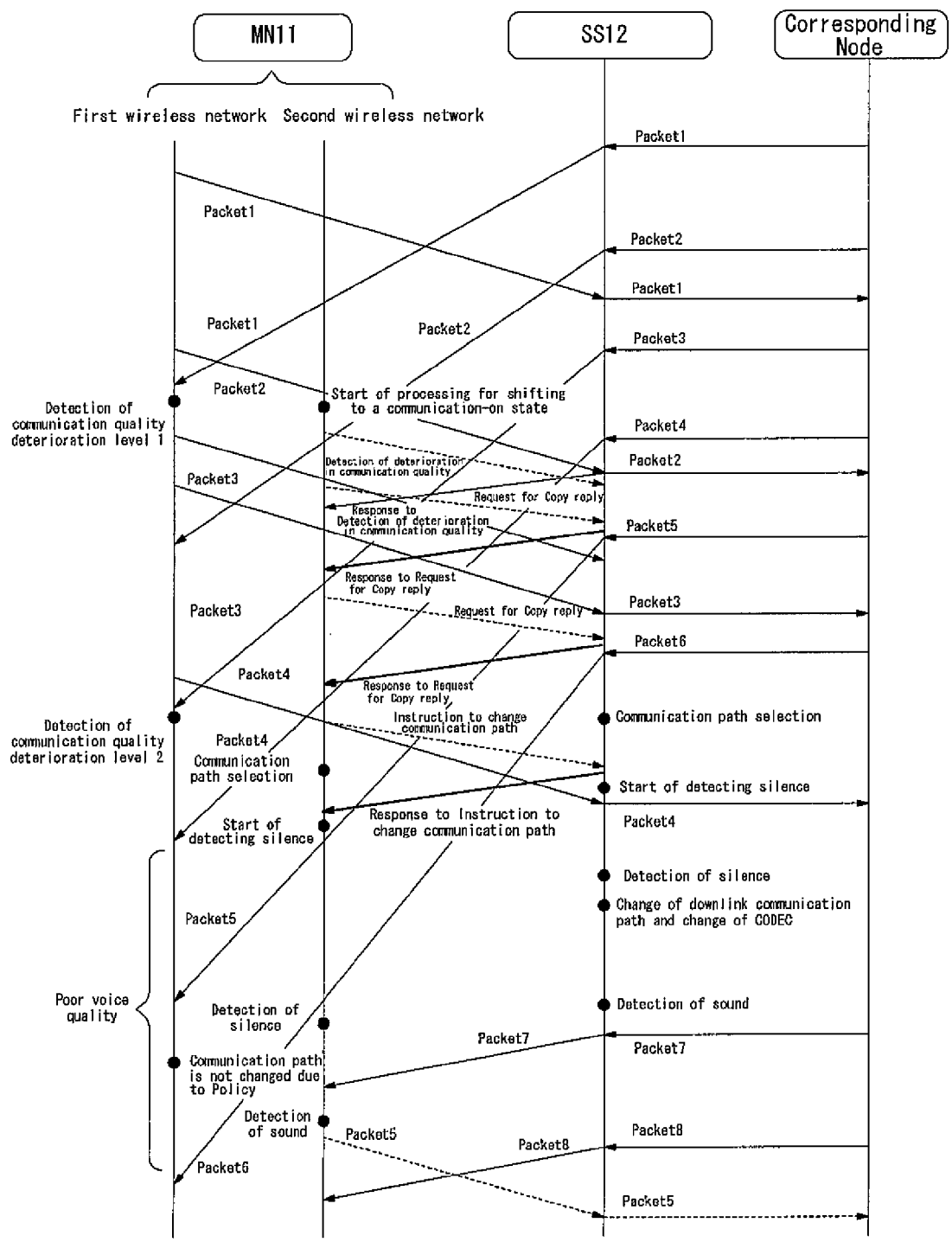
FIG. 8 is a diagram representing a case where deterioration in communication quality is detected by MN during communication via a first wireless network.

FIG. 7 and FIG. 8 are diagrams respectively showing a case where deterioration in communication quality has been detected during communication by MN via the first wireless network. In FIG. 7, at first, MN 11 and SS 12 are performing communication via a wireless link of the first wireless network. When MN 11 has detected communication quality deterioration level 1 as a result of analyzing the wireless information obtained thereby (i.e. when the first threshold value, of the two threshold values, is satisfied), a process for shifting the second wireless network from a dormant or power-off state to a communication-on state is started at MN 11. After the shifting of the second wireless network to the communication-on state is completed, MN 11 transmits "Detection of deterioration in communication quality" to SS 12 and transmits "Request for Copy reply" to SS 12. SS 12 transmits to MN 11 "Response to Detection of deterioration in communication quality" via the second wireless network.

Upon receiving "Request for Copy reply", SS 12 replaces only palyload of the message and transmits the modified one to MN 11 via the second wireless network. By using what is called "echo back" of packets as described above, MN 11 and SS 12 carry out a statistic processing of the received packets (e.g. monitoring of packet arrival intervals), check the reception state of the second wireless network as a new communication path, and judges whether or not switching to the communication paths can be carried out. In the case of FIG. 7, the second wireless network is selected as a new communication path at MN 11.

Thereafter, when MN 11 has detected communication quality deterioration level 2 (i.e. when the second threshold value, of the two threshold values, is satisfied), "Instruction to change communication path" is transmitted to SS 12 to perform switching of the downlink communication path. Upon receiving "Instruction to change communication path", SS 12 transmits to MN 11 "Response to Instruction to change communication path". Thereafter, in a case where SS 12 detects silence, SS 12 carries out a processing for switching the downlink communication path to the second wireless network and at the same time makes changes to a codec which is the most suitable for the features of the wireless downlink of the second wireless network.

When SS 12 has detected silence in the downlink and RTP packets flow thereto from CN, the payload and RTP header which have been subjected to trans-codec for codec changed in the second wireless network as the new communication path are attached to the packets and then the packets are transmitted to MN 11 in a frame having tunneling of VPN 13, 14, 15 attached thereto.

Thereafter, the same down/uplink communication path is selected by Policy after detection of silence at MN 11, as well. In this case, MN 11 carries out a processing for switching the uplink communication path to the second wireless network and at the same time makes changes to a codec which is the most suitable for the characteristic of the wireless uplink of the second wireless network.

When MN 11 has detected sound in the uplink and RTP packets flow thereto from the application 32, the payload and RTP header which have been subjected to trans-codec for codec changed in the second wireless network as the new communication path are attached to the packets and then the packets are transmitted to MN 11 in a frame having tunneling of VPN 13, 14, 15 attached thereto.

In a case where the application 32 is Soft Phone within MN 11, since a RTP packet having Payload encoded by codec which has already been changed is generated, there is no need to perform trans-codec in the control unit 28 of MN 11.

In FIG. 8, as a result of detecting deterioration in communication quality at MN 11, only the downlink communication path is changed to the second wireless network, while the uplink communication path continues using the first wireless network.

Figure 9:
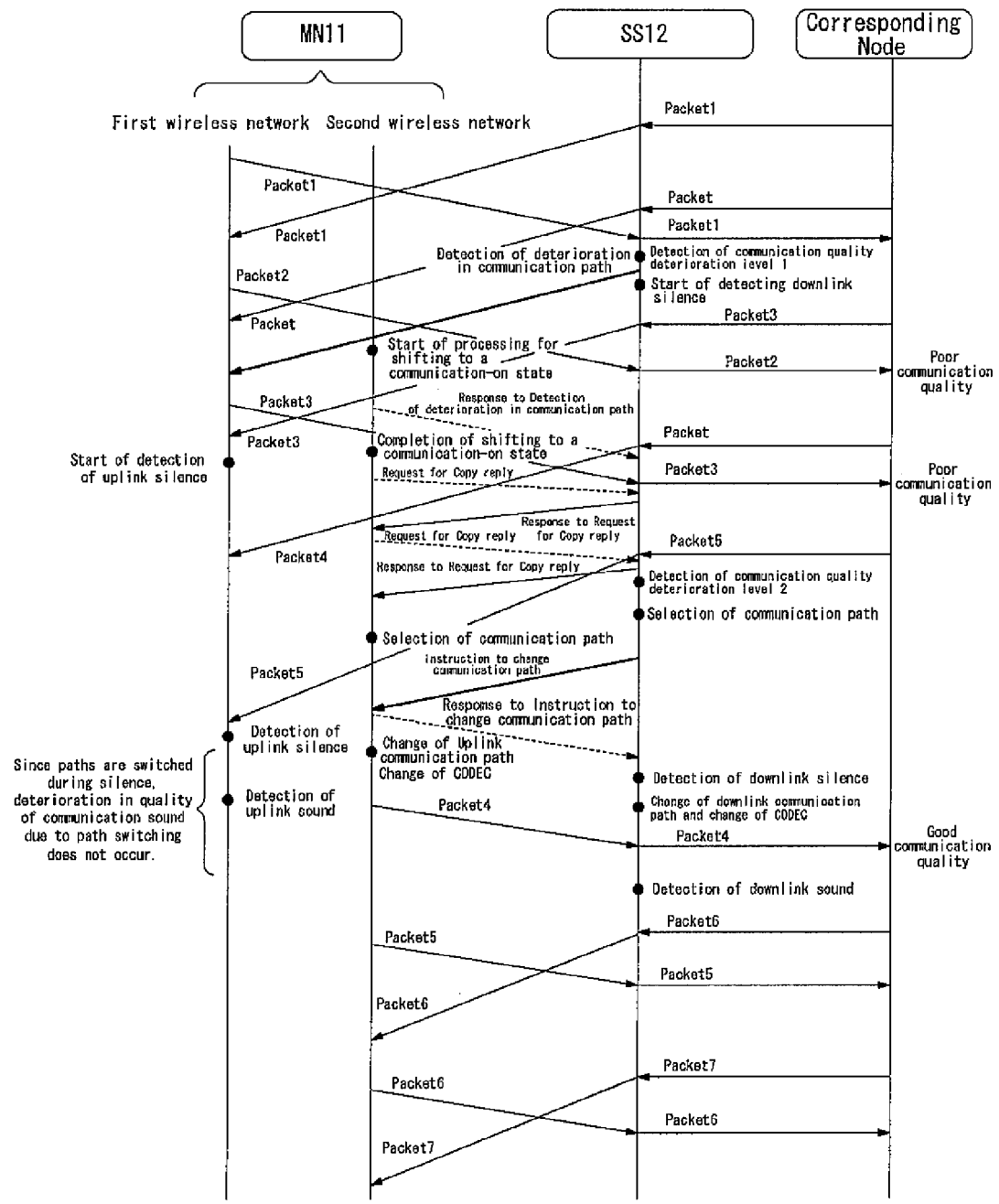
FIG. 9 is a diagram representing a case where deterioration in communication quality is detected by SS during communication via a first wireless network.
Figure 10:
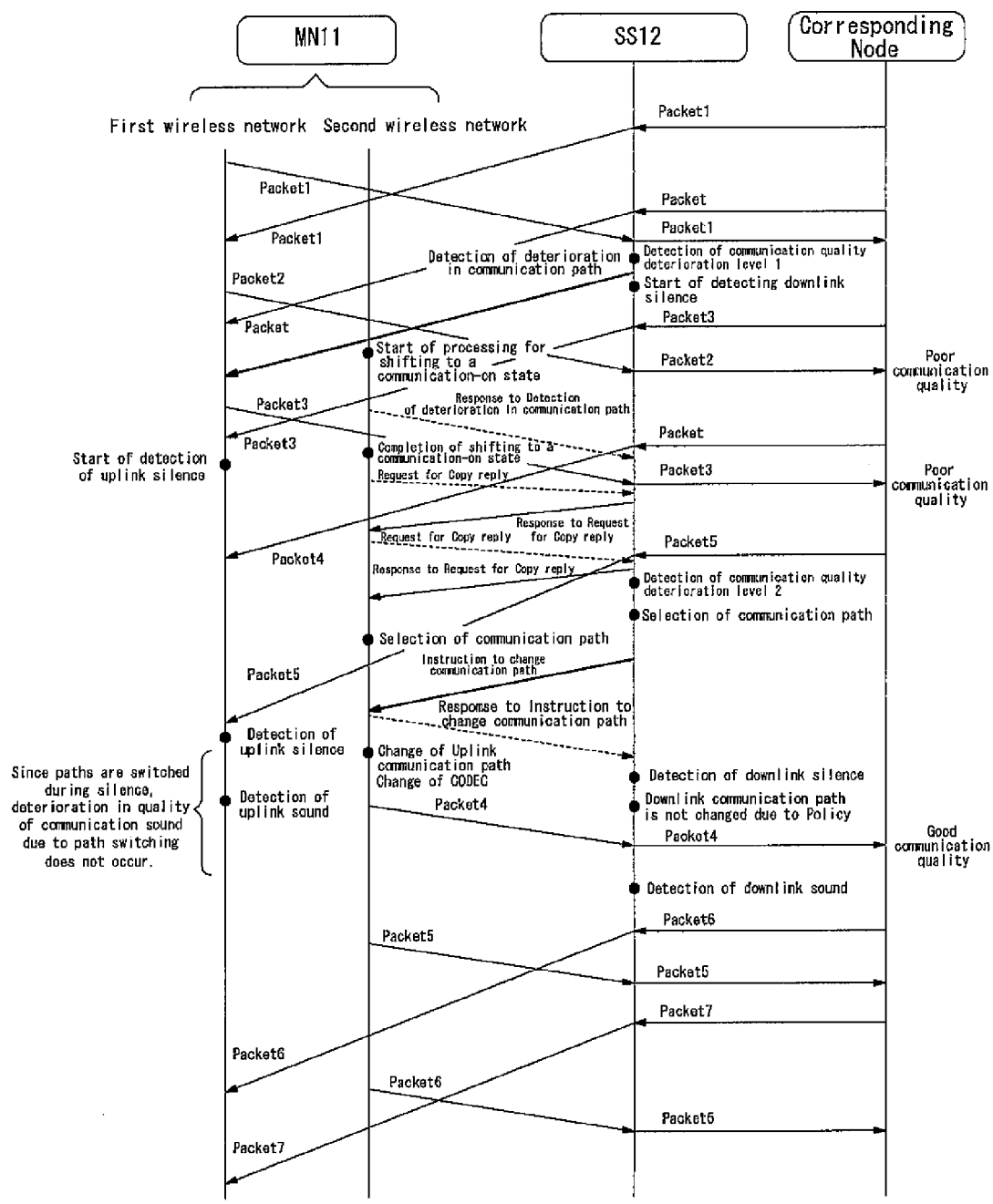
FIG. 10 is a diagram representing a case where deterioration in communication quality is detected by SS during communication via a first wireless network.

FIG. 9 and FIG. 10 are diagrams respectively showing a case where deterioration in communication quality has been detected during communication by SS12 via the first wireless network. In FIG. 9, when SS 12 detects communication quality deterioration level 1 during communication between MN 11 and SS 12 via the first wireless network (i.e. when the first threshold value, of the two threshold values, is satisfied), SS 12 transmits "Detection of deterioration in communication quality" to MN 11 and simultaneously starts detection of silence in the downlink.

In MN 11, a process for shifting the second wireless network from a dormant or power-off state to a communication-on state is started. After the shifting of the second wireless network to the communication-on state is completed, MN 11 transmits "Response to Detection of deterioration in communication quality" to SS 12 via the second wireless network and then transmits "Request for Copy reply" to SS 12.

Upon receiving "Request for Copy reply", SS 12 replaces only payload of the message and transmits the modified one to MN 11 via the second wireless network. By using what is called "echo back" of packets as described above, MN 11 and SS 12 carry out a statistic processing of the received packets (e.g. monitoring of packet arrival intervals), check the reception state of the second wireless network as a new communication path, and judges whether or not switching to the communication paths can be carried out. In the case of FIG. 9, the second wireless network is selected as a new communication path at MN 11.

Thereafter, when MN 11 has detected communication quality deterioration level 2 (i.e. when the second threshold value, of the two threshold values, is satisfied), "Instruction to change communication path" is transmitted to MN 11 to perform switching of the uplink communication path. Upon receiving "Instruction to change communication path", MN 11 transmits to SN 12 "Response to Instruction to change communication path". Thereafter, in a case where silence is detected, a processing for switching the uplink communication path to the second wireless network is carried out and at the same time codec is changed to a codec which is the most suitable for the characteristic of the wireless downlink of the second wireless network.

When MN has detected silence in the uplink and RTP packets flow thereto from CN, the payload and RTP header which have been subjected to trans-codec for codec changed in the second wireless network as the new communication path are attached to the packets and then the packets are transmitted to MN 11 in a frame having tunneling of VPN 13, 14, 15 attached thereto.

In a case where the application 32 is Soft Phone within MN 11, since a RTP packet having Payload encoded by codec which has already been changed is generated, there is no need to perform trans-codec in the control unit 28 of MN 11.

Thereafter, the same up/downlink communication path is selected by Policy after detection of silence at SS 12, as well. In this case, SS 12 carries out a processing for switching the downlink communication path to the second wireless network and at the same time makes changes to a codec which is the most suitable for the features of the downstream wireless link of the second wireless network.

When MN 11 has detected sound in the uplink and RTP packets flow thereto from the application 32, the payload and RTP header which have been subjected to trans-codec for codec changed in the second wireless network as the new communication path are attached to the packets and then the packets are transmitted to MN 11 in a frame having tunneling of VPN 13, 14, 15 attached thereto.

FIG. 10 shows a case where SS 12 continues to maintain communication of the first wireless network, due to Policy, because SS 12 has already performed switching of the uplink communication link and the quality of the downlink communication has not deteriorated, in particular. In this case, communication is switched to the second wireless network at a stage when deterioration in quality of the downlink communication is notified by MN 11.

FIGS. 7 to 10 show cases where a communication path is switched from the first wireless network to the second wireless network. However, in an opposite manner, a communication path can be switched from the second wireless network to the first wireless network by a similar mechanism.

Next, a method of detecting deterioration in communication quality at MN 11 will be described in detail. Examples of wireless information which can be acquired at MN 11 include RSSI, SNIR (signal to noise and interference ratio), transmission power, DRC (data rate control), DRC_Lock, throughput, and the like. A communication card such as WLAN and PHS can normally acquire only RSSI among the aforementioned wireless information. However, since the downlink band is correlated to RSSI, communication quality deterioration level can be judged by judging the RSSI level according to a certain threshold value. Further, in EV-DO, the communication quality deterioration level can be more correctly judged by using, in addition to RSSI, the wireless information such as SNIR, transmission power, DRC (data rate control) and DRC_Lock.

First, in the case of EV-DO, communication quality deterioration level 1 and communication quality deterioration level 2 are judged under following conditions. In the case of communication quality deterioration level 1, it suffices that any one of the following conditions is met.

$SINR \leq Thresh\_SINR\_1$
$DRC\ information \leq Thresh\_DRC\_1$
$Transmission\ output \geq Thresh\_Tx\_Power\_1$
$DRC\ Lock\ information \leq Thresh\_DRC\_Lock\_1$
$RSSI \leq Thresh\_RSSI\_1$ In the case of communication quality deterioration level 2, it suffices that any one of the following conditions is met.

$SINR \leq Thresh\_SINR\_2$
$DRC\ information \leq Thresh\_DRC\_2$
$Transmission\ output \geq Thresh\_Tx\_Power\_2$
$DRC\ Lock\ information \leq Thresh\_DRC\_Lock\_2$
$RSSI \leq Thresh\_RSSI\_2$ Next, in other wireless communications, communication quality deterioration level 1 and communication quality deterioration level 2 are judged under following conditions using RSSI.

$RSSI \leq Thresh\_RSSI\_1$

In the case of communication quality deterioration level 2, it suffices that any one of the following conditions is met.

$RSSI \leq Thresh\_RSSI\_2$

Regarding communication quality deterioration level 1, detection is carried out as described above. However, in actual practice, it is necessary to prepare parameters of the detection conditions and the threshold values corresponding thereto for each mobile terminal communication to be changed as shown in a table below and make judgment for each communication. This is because time required for a dormant or power-off state to be shifted to a communication-on state varies depending on each mobile body communication.

TABLE 4

Parameters in the conditions for judging communication quality deterioration level 1 in other mobile communication at MN 11

| | RSSI |
|---|---|
| Mobile body communication 1 | Thresh_RSSI_11 |
| Mobile body communication 2 | Thresh_RSSI_12 |
| • | • |
| Mobile body communication n | Thresh_RSSI_1n |

Next, a method of detecting deterioration in communication quality at SS12 11 will be described in detail.

Figure 11:
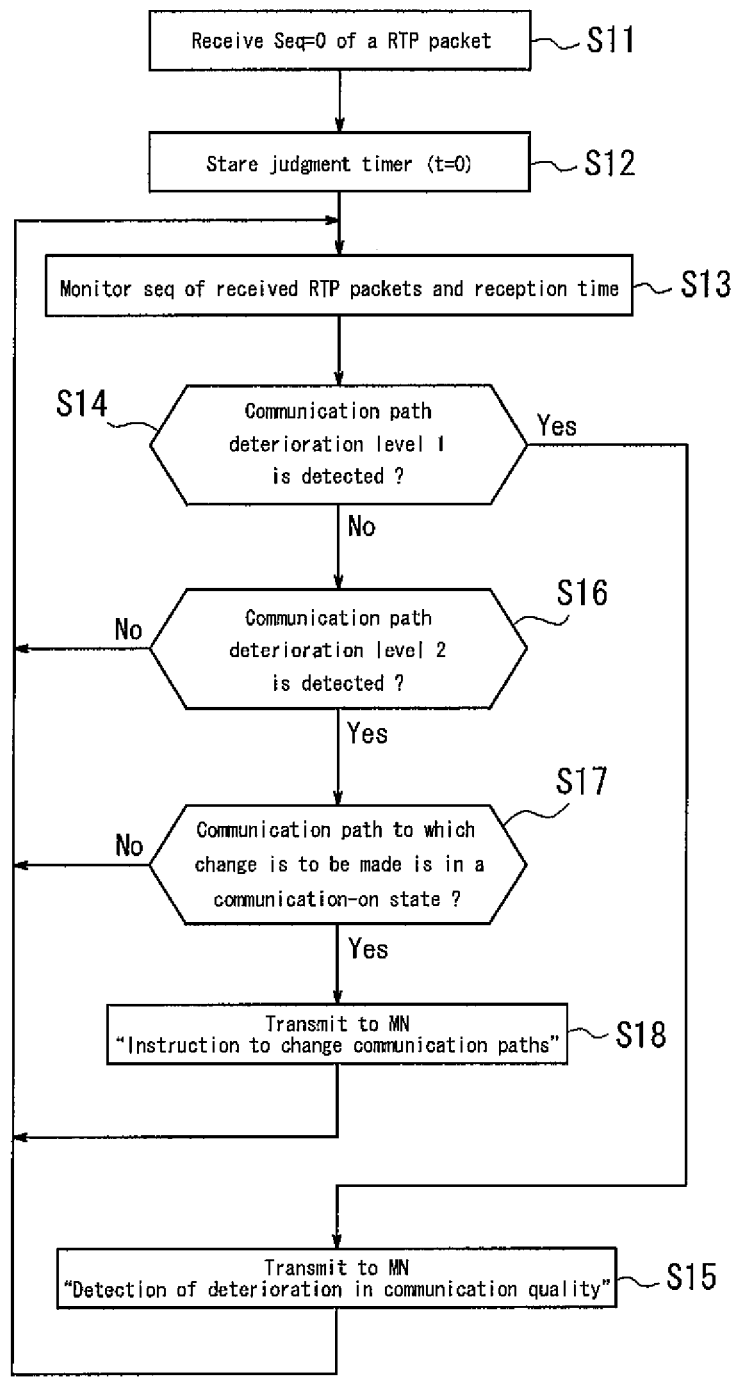
FIG. 11 is a diagram for explaining path switching at SS.

At SS 12, deterioration in quality of the uplink communication is detected by monitoring the packet intervals of the received RTP packets by using a time window corresponding to a jitter buffer used in Soft Phone and IP phone. FIG. 11 is a diagram for explaining path switching at SS 12. At SS 12, when communication or conversation is started between MN 11 and CN, transmission of RTP packets is started from Seq=0 in each direction from MN 11 to CN and from CN to MN 11.

In this method, given that the path in use for communication is a mobile communication path 1, SS 12 receives Seq=0 of a RTP packet from MN 11 to CN (Step S101) and a judging timer used for judging path switching is started (Step S102). Next, the sequence number of RTP packets received by CN from MN 11, as well as reception time corresponding thereto, are monitored in association with the timer (Step S103).

Next, the communication path selection unit of SS 12 carries out detection of communication path deterioration level 1 every time a RTP packet is received through monitoring the sequence number and the timer. Regarding the conditions for detection, communication path deterioration level 1 is detected when any of following four conditions is met.

$t-(seq*20\ ms) > Threshold\ value\ 1$ $M\ times\ in\ recent\ N\ packets\ t-(seq*20\ ms) > Threshold\ value\ 2$ $K\ times\ in\ recent\ N\ packets\ t-(seq*20\ ms) > Threshold\ value\ 3$ $Reception\ intervals\ of\ recent\ N\ packets > Threshold\ value\ 4$ Threshold value 1, Threshold value 2, Threshold value 3, Threshold value 4, N, M, K are set, for example, at 70 ms, 60 ms, 50 ms, 35 ms, 10, 2, 3, respectively. In this example, seq*20 ms is used, which applies to codec using 20 ms frame. In a case of 30 ms frame, seq*30 ms is used.

TABLE 3

Parameters in the conditions for judging communication quality deterioration level 1 in EV-DO at MN 11

| | SINR | DRC | Transmission power | DRC_Lock | RSSI |
|---|---|---|---|---|---|
| Mobile body communication 1 | Thresh_SINR_11 | Thresh_DRC_11 | Thresh_Tx_Power_11 | Thresh_DRC_Lock_11 | Thresh_RSSI_11 |
| Mobile body communication 2 | Thresh_SINR_12 | Thresh_DRC_12 | Thresh_Tx_Power_12 | Thresh_DRC_Lock_12 | Thresh_RSSI_12 |
| • | • | • | • | • | • |
| Mobile body communication n | Thresh_SINR_1n | Thresh_DRC_1n | Thresh_Tx_Power_1n | Thresh_DRC_Lock_1n | Thresh_RSSI_1n |

When the condition of communication path deterioration level 1 is met upon receiving a RTP packet at Step S104, SS 12 transmits "Detection of deterioration in communication quality" to MN 11 and also commands MN11 to start a process for shifting the mobile communication to be changed at MN 11, from a dormant or power-off state to a communication-on state (Step S105), then returning to Step S103. In contrast, when the condition of communication path deterioration level 1 is not met, it is assumed that the uplink wireless path (from MN 11 to CN) currently in use for communication does not have a problem particularly, whereby the uplink wireless path continues to be used and detection of communication path deterioration level 2 is carried out (Step S106). Regarding the conditions for detection, communication path deterioration level 2 is detected when any of following four conditions is met.

$$t-(seq*20\ ms) > \text{Threshold value 1}$$

$$M \text{ times in recent } N \text{ packets } t-(seq*20\ ms) > \text{Threshold value 2}$$

$$K \text{ times in recent } N \text{ packets } t-(seq*20\ ms) > \text{Threshold value 3}$$

$$\text{Reception intervals of recent N packets} > \text{Threshold value 4}$$

Threshold value 1, Threshold value 2, Threshold value 3, Threshold value 4, N, M, K are set, for example, at 80 ms, 70 ms, 50 ms, 40 ms, 10, 3, 5, respectively. In this example, seq*20 ms is used, which applies to codec using 20 ms frame. In a case of 30 ms frame, seq*30 ms is used.

When the condition of communication path deterioration level 2 is met upon receiving a RTP packet at Step S107, it is judged whether the mobile communication to be changed is in a communication-on state or not (Step S107). When the mobile communication to which change is to be made is in a communication-on state, "Instruction to change communication paths" is transmitted to MN 11 (Step S108) and the procedure returns to Step S103. When communication path deterioration level 2 is not detected at Step S106 or the mobile communication to which change is to be made is not in a communication-on state, the procedure returns to Steps S103.

According to the operations described above, switching of paths can be carried out by SS12 monitoring the state of the uplink path. Due to this, for example, in a situation where the downlink wireless state is good and RTP packets received by MN 11 are arriving without problems but there is a problem in the uplink path such that uplink RTP packet jitter increases, SS 12 can start switching paths to suppress generation of voice break on the CN side.

To detect communication quality deterioration level 1, it is necessary to prepare parameters of the detection conditions and the threshold values corresponding thereto for each mobile terminal communication to be changed as shown in a table below and make judgment for each communication. This is because time required for a dormant or power-off state to be shifted to a communication-on state varies depending on each mobile body communication.

TABLE 5

Parameters in the conditions for judging communication quality deterioration level 1 at SS 12

|  | Threshold value 1 | Threshold value 2 | Threshold value 3 | Threshold value 4 | N | M | K |
|---|---|---|---|---|---|---|---|
| Mobile body communication 1 | Thresh 11 | Thresh 21 | Thresh 31 | Thresh 41 | N1 | M1 | K1 |
| Mobile body communication 2 | Thresh 12 | Thresh 22 | Thresh 32 | Thresh 42 | N2 | M2 | K2 |
| . | . | . | . | . | . | . | . |
| Mobile body communication n | Thresh 1n | Thresh 2n | Thresh 3n | Thresh 4n | Nn | Mn | Kn |

Figure 12:
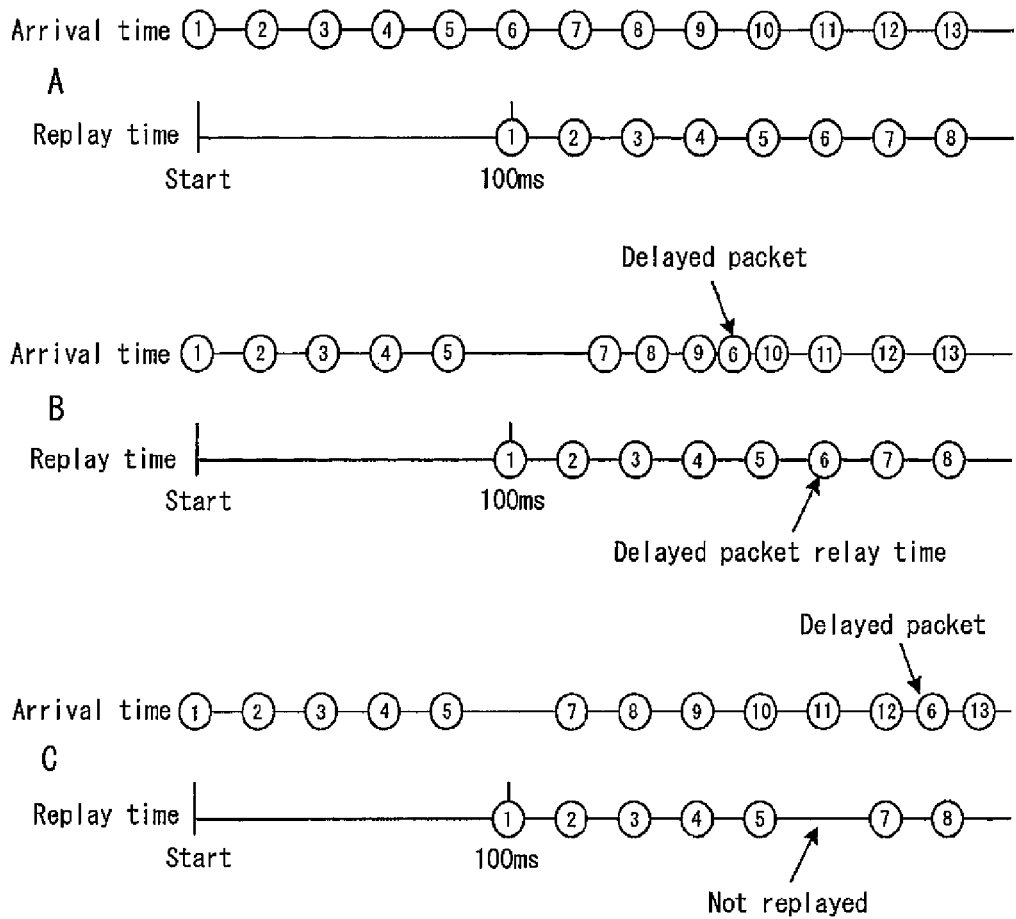
FIGS. 12A-12C are diagrams for each explaining a relationship between arrival time of RTP packets and replay time on the Soft Phone reception side.

FIGS. 12A-12C are diagrams for each explaining a relationship between arrival time and replay time of RTP packets on the Soft Phone reception side. In Soft Phone, in consideration of packet jitter in a network, a packet is subjected to buffering, with delayed time before replay, and replay is started when replay time comes. This replay time is equal to a jitter buffer.

In the examples of FIGS. 12A-12C, the jitter buffer is 100 ms. FIG. 12A shows a case where all of the packets have arrived without delay. In FIG. 12A, in Soft Phone on the reception side, replay of the first packet is started when 100 ms have passed since the arrival of the first RTP packet. All of the subsequent packets are each reproduced 100 ms after the arrival thereof. Accordingly, in the jitter buffer, replay is performed if there is delay in packet arrival.

FIG. 12B shows a case where the packet of sequence number 6 is delayed in the network and arrives between sequence number 9 and sequence number 10. In this case, since the packet of sequence number 6 has arrived prior to the replay time thereof, this packet will be reproduced.

FIG. 12C shows a case where the packet of sequence number 6 arrives between sequence number 12 and sequence number 13 due to delay. In this case, since the packet of sequence number 6 arrives after the replay time thereof, this packet will not be reproduced and discarded.

<Embodiment 2>

Figure 13:
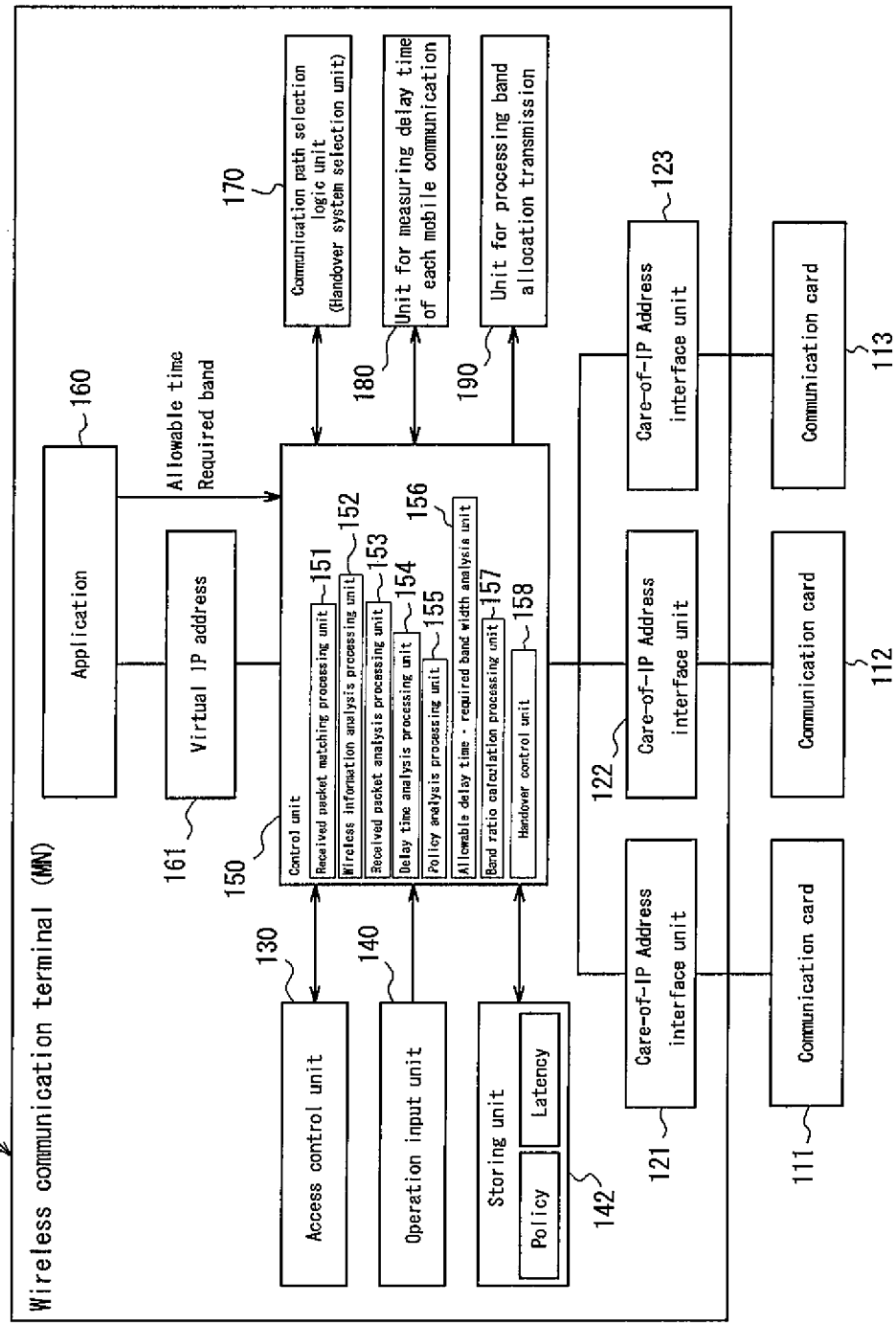
FIG. 13 is a block diagram of a wireless communication terminal (MN; mobile node) according to a second embodiment of the present invention.

FIG. 13 is a block diagram of a wireless communication terminal (MN; mobile node) according to a second embodiment of the present invention. In the wireless communication apparatus (a method of controlling the apparatus) of the present invention, the most suitable system is automatically selected according to necessity from following four handover systems, to perform handover.

Vertical synchronization system: simultaneous handover of the uplink and the downlink is performed, Up/down asynchronous system: asynchronous (independent) handover of the uplink and the downlink is performed, Synchronization connection bandwidth complementary system: a terminal is simultaneously connected to another wireless communication network, while connection of the terminal with one wireless communication network currently in use for communication is maintained, and handover to the another wireless communication network is performed with complementing an insufficient bandwidth, and In-the-same-network switching system: handover is performed from a base station or sector currently in use for connection to another base station or sector in the same wireless communication network For example, in a case where handover is performed by the up/down asynchronous system, upon occurrence of deterioration in quality of either the uplink or downlink, only the deteriorated link is switched to another wireless communication network or, another base station. Therefore, latency required for handover is shorter than the vertical synchronization system, which is very advantageous in terms of communication quality.

Further, the synchronization connection bandwidth complementary system is a method of complementing a bandwidth insufficient in one wireless communication network as the main path currently in use for communication by simultaneously performing communication with another wireless communication network. As the terminal moves to the area fringe of the main path, the ratio of communication with the another wireless communication network increases and, when the main path goes beyond the area, communication is performed 100% via the another wireless communication network (i.e. handover is completed. Therefore, if delay in the wireless network is ignored, latency required for handover is zero, in principle, which is very advantageous in terms of communication quality. However, since plural wireless communication networks are simultaneously used therein, the synchronization connection bandwidth complementary system and the up/down asynchronous system are disadvantageous, as compared with the vertical synchronization system, in terms of communication charge, communication time and power consumption.

Further, in a wireless communication network where an unignorably large magnitude of latency occurs in a handover between (stations or sectors of) the same wireless communication network, as a result of handover being performed unconditionally, quality in service may significantly deteriorate. However, in the present invention, quality in service can be maintained satisfactory by performing handover to another wireless network in consideration of Policy and allowable delay time of the application. By loading a unit for defining/acquiring or notifying Policy, allowable delay time of the application and latency of handover between the same wireless network regarding handover as described above, handover which is the most suitable to the Policy and application selected by the user can be realized.

Hereinafter, for convenience, the vertical synchronization system will be referred to as "the basic handover", the up/down asynchronous system as "up/down independent handover", the synchronization connection bandwidth complementary system as "bandwidth complementing handover" and the in-the-same-network switching system as "the in-the-same-network handover". Further, latency at the application level by the basic handover is assumed to be Lbh[ms]. Latency at the application level in the same network handover is assumed to be Lsnw[ms].

Typical delay time (up/down) of each wireless communication network will be defined as follows:

DNW1: Typical delay time of wireless communication network NW1
DNW2: Typical delay time of wireless communication network NW2
DNW3: Typical delay time of wireless communication network NW3

Further, since delay can always be monitored in the wireless communication network currently in use for communication, the average delay time in the latest T seconds is obtained as Dcrt. In the wireless network to which handover is to be performed, actual delay can be measured by transmitting Echo command from MN to SS after establishing communication. In the present embodiment, the average delay time measured over T2 seconds is expressed for each wireless communication network as follows.

DmNW1: Average delay time (return) measured in a case where the wireless network to which handover is performed is the wireless communication network NW1
DmNW2: Average delay time (return) measured in a case where the wireless network to which handover is performed is the wireless communication network NW2
DmNW3: Average delay time (return) measured in a case where the wireless network to which handover is performed is the wireless communication network NW3

In FIG. 13, The wireless communication terminal (MN) 11 has Care-of-IP Address interface units 121, 122, 123 to which communication cards 111, 112, 113 are connected, access control unit 130, operation input unit 140, storing unit 142, control unit 150, application 160, and a virtual IP address 161. Further, MN 11 includes communication path selection logic unit (handover system selection unit) 170, measuring unit 180 for measuring delay time of each mobile communication, and processing unit 190 for processing bandwidth allocation transmission.

As in the first embodiment, FIG. 3 shows a frame format transmitted from the wireless communication terminal MN. However, it is possible to know at Switching server SS, by referring to the Care-of-IP Address, via which communication path the transmission has been made. Further, IP mobility is ensured by: setting at Switching server, after decapsulating VPN, the address of the correspondence node CN as the destination address by using the home IP address of FIG. 3 (this is actually a virtual IP address exclusively used by the application of MN) as the source address; and transmitting payload to CN. Accordingly, in principle, it is possible for the switching server SS to perform transmission to MN by using plural communication paths. Further, At MN, it is possible to receive a packet transmitted by the switching server, by way of a communication path different from the communication path which MN itself used for transmission. It suffices that MN 11 transmits (inputs) a packet received from the switching server to an application on the basis of the home IP address among the decapsulated VPN packets, which IP address is exclusively used by the MN application. Therefore, it basically does not matter via which communication path the switching server made transmission. In other words, via whichever communication path a packet has been transmitted from the switching server, the packet can always be sent to the application of MN. Accordingly, at either MN or the switching server, via whichever communication path a packet is received, such packets received from plural communication paths will have a frame of the same format after decapsulation of VPN, whereby communication by using different communication paths for the uplink and downlink can be maintained if only matching of the received packets is ensured.

Returning to FIG. 13, the access control unit 130 controls, aside from the normal data communication between MN 11 and SS 12, switching of the communication interfaces and echo back of a control packet between MN 11 and SS 12. The access control unit 130 includes a coverage area monitoring unit (not shown), and the communication area monitoring unit checks the communication environment by performing echo back with respect to the communication path currently not in use for communication. Further, the communication area monitoring unit checks the communication state by monitoring packet reception intervals at MN 11 and SS 12, respectively, and the obtained results are used at the communication path selection logic unit 170 in order to determine to which communication path the switching is to be made.

The control unit 150 includes a processing unit 151 for matching received packets, a processing unit 152 for analyzing wireless information, a processing unit 153 for analyzing received packets, a processing unit 154 for analyzing delay time, a processing unit 155 for analyzing Policy, an analyzing unit 156 for analyzing allowable delay time required bandwidth, a processing unit 157 for calculating a bandwidth ratio, and a handover control unit 158.

The received packet matching processing unit 151 realizes a function of a jitter buffer and also matches the order of packets received from two or more mobile communication networks. In the case of a real-time application such as VoIP (Voice Over IP), the sequence number of RTP (Real-time transport protocol) is checked.

The wireless information analysis processing unit 152 analyzes wireless information which MN 11 received in mobile communication in a communication-on state e.g. throughput, SINR, RSSI, DRC, Tx_Power) and the analysis result is used for detecting deterioration in communication quality in the wireless downlink. The received packet analysis processing unit 153 analyzes the statistic information of data packets received by MN 11 (throughput, packet loss, underrun count, overrun count). Then, in a case of a communication path currently in use for communication, the received packet analysis processing unit 153 can judge whether or not the communication quality has been deteriorated. In a case of a communication path currently not in use for communication, the received packet analysis processing unit 153 judges whether or not the communication path is to be switched, while checking the communication state (the radio propagation environment). The judgment result is passed to the communication path selection logic unit (handover system selection unit) 170.

The operation inputting unit 140 functions as policy setting unit and is an user interface at which an user sets (or inputs/selects) Policy regarding handover. The storing unit 142 stores information thus set and the like. The poly analysis processing unit 155 is a processing unit for analyzing the Policy regarding handover inputted by the user. The each-mobile communication delay time measuring unit 180 is a processing unit for measuring delay time for each wireless communication network. The delay time analysis processing unit 154 of each wireless communication network is a processing unit for calculating difference in delay (difference in time) between two different wireless communication networks by using the average delay time of each wireless communication network which is defined in advance and the delay time measured by the each-mobile communication delay time measuring unit 180. The allowable delay time required bandwidth analysis unit 156 is a processing unit for analyzing allowable delay time and required bandwidth notified by the application.

The bandwidth ratio calculation processing unit 157 is a processing unit for calculating the bandwidth ratio when SS performs allocation transmission via plural wireless communication networks, based on the number of received packets. The bandwidth allocation transmission processing unit 190 carries out allocation transmission via plural different wireless communication networks, based on the bandwidth ratio notified by SS.

MN 11 further includes a unit (not shown) for detecting silence in the uplink sound, and the silence detecting unit detects that the uplink sound is silence prior to encoding to the RTP packet of VoIP. Due to this, the uplink communication path can be switched when silence is detected therein. The communication path selection logic unit 170 makes judgment on whether or not the communication path is to be switched to another communication path and judgment on, when the communication path is to be switched to another communication path, to which communication path the switching is to be performed.

Regarding the application 160 of MN 11, IP mobility is ensured by providing the application 160 with the same IP address permanently, if a network of the mobile communication to which MN 11 is connected is changed, by using a virtual IP address 161 (hope IP address). Further, regarding different mobile communications, Care-of-IP-Address CoA corresponding to the respective mobile communications are possessed (in many cases, Care-of-IP-Address is provided from each mobile network when MN 11 is connected to the mobile communication network.

At SS12, it can be known through which communication path the transmission was made by seeing the Care-of-IP-Address. Further, at SS 12, IP mobility is ensured by: setting, after decapsulating capsules 13, 14, 15 of VPN, the address of the correspondence node CN as the destination address by using the home IP address of FIG. 3 (this is actually a virtual IP address 161 exclusively used by the application 160 of MN) as the source address; and transmitting payload to CN. Accordingly, it is possible for SS 12 to perform transmission to MN by using plural communication paths.

Further, At MN, it is possible to receive a packet transmitted by SS 12, by way of a communication path different from the communication path which MN itself used for transmission. It suffices that MN 11 transmits (inputs) a packet received from SS 12 to an application on the basis of the home IP address among the decapsulated VPN packets, which IP address is exclusively used by the application 160 of MN 11. Therefore, it basically does not matter via which communication path the SS 12 made transmission. In other words, via whichever communication path a packet has been transmitted from SS 12, the packet can always be transmitted (inputted) to the application 160 of MN 11.

Accordingly, at either MN 11 or SS 12, via whichever communication path a packet is received, such packets received from plural communication paths will have a frame of the same format after decapsulation of VPN, whereby communication by using different communication paths for the uplink and downlink can be maintained if only matching of the received packets is ensured.

The application unit 150 further includes application information acquisition unit (not shown). The application information acquisition unit acquires allowable delay (Dap), the uplink required bandwidth (BW_UPap) and the downlink required bandwidth (BW_DNPap) from the application 160. The received packet analysis processing unit 153 predicts up/down average bandwidth from the wireless information (RSSI, CNR, SNR, DRC and the like) of the wireless network to which handover is to be performed. The predicted average bandwidths are expressed or defined as below.

BW_UPexNW1: Uplink predicted average bandwidth in wireless communication network NW1
BW_UPexNW2: Uplink predicted average bandwidth in wireless communication network NW2
BW_UPexNW3: Uplink predicted average bandwidth in wireless communication network NW3

BW_DNexNW1: Downlink predicted average bandwidth in wireless communication network NW1

BW_DNexNW2: Downlink predicted average bandwidth in wireless communication network NW2

BW_DNexNW3: Downlink predicted average bandwidth in wireless communication network NW3

For example, in a case where CDMA2000 1x EV-DO is used as a wireless communication network, calculation is made as follows.

<Uplink Predicted Average bandwidth>

A set of the maximum transmission rates, each converted from the average RSSI (received signal strength indicator) monitored for T2 seconds in the past at T3 [ms] cycle, is collected. From the average of the maximum transmission rates, the uplink predicted average bandwidth is calculated.

<Downlink Predicted Average Bandwidth>

The average DRC (data rate control) for T2 seconds in the past is calculated from the average DRC monitored at T3 [ms] cycle. The downlink predicted average bandwidth is calculated from DRC.

<Transmission Current Value of Wireless Communication Network Apparatus>

Consumed electric current value during transmission at each wireless communication apparatus mainly influences the total communication time from the previous battery charge until the battery needs to be charged again, i.e. the electric current consumption. Therefore, consumed electric current value during transmission is obtained for each wireless communication apparatus as follows (respective current values I_NW1, I_NW2, I_NW3 of wireless communication networks NW1, NW2, NW3). For example, current value I_NW1 of wireless communication network NW1 is obtained as follows.

(i) In a case where the wireless communication is not a multi-carrier communication (i.e. the transmission bandwidth is constant), e.g. CDMA2000 1x EV-DO, electric current during transmission can be obtained from the transmission output power value (which value will be referred to as "Tx_pwr" hereinafter) and the current value consumed by reception can be ignored. Therefore, the electric current during transmission can be regarded as the current value consumed by the communication. Although the calculation method differs depending on the communication system, in the present embodiment, it is defined as follows:

Current value during transmission=$f(Tx\_pwr)$.

If the electric current during transmission cannot be expressed as a function, it may be defined as a table memorizing power values and consumed electric current values during transmission corresponding thereto (unit: 0.5 dBm). Accordingly, for example, the current value during transmission at wireless communication network NW1 is obtained by the formula below:

$I\_NW1=f(Tx\_pwr)$ (ii) In a case where the wireless communication is a multi-carrier communication (i.e. the transmission bandwidth is variable), e.g. OFDMA, electric current during transmission is determined by the two factors, i.e. the transmission output power value (Tx_pwr) and the transmission bandwidth (band of subcarrier). Given that the bandwidth during transmission is BW_Tx, it is defined that:

Consumed electric current value during transmission=$F(Tx\_pwr, BW\_Tx)$

Accordingly, for example, the current value during transmission at wireless communication network NW1 is obtained by the formula below:

$I\_NW1=(Tx\_pwr, BW\_Tx)$

<Transmission Current at Time of Handover>

Regarding the basic handover and the up/down independent handover, since there exist other factors which affect consumed electric current value, such as transmission output power, transmission bandwidth or the like, it not possible to generally conclude that the basic handover requires less transmission electric current than the up/down independent handover does. Accordingly, transmission current values thereof are calculated, respectively, as follows.

(1) Case where Handover is Performed from Wireless Communication Network NW1 to Wireless Communication Network NW2

Transmission current in the basis handover (I_bho)= I_NW2

Transmission current in the up/down independent handover (I_iho)=I_NW1 (in a case where the downlink transmission is transmitted by the up/down independent handover via wireless communication network NW2)

Transmission current in the up/down independent handover (I_iho)=I_NW2 (in a case where the uplink transmission is transmitted by the up/down independent handover via wireless communication network NW2)

(1) Case Where Handover is Performed from Wireless Communication Network NW2 to Wireless Communication Network NW1

Transmission current in the basis handover (I_bho)= I_NW1

Transmission current in the up/down independent handover (I_iho)=I_NW2 (in a case where the downlink transmission is transmitted by the up/down independent handover via wireless communication network NW1)

Transmission current in the up/down independent handover (I_iho)=I_NW1 (in a case where the uplink transmission is transmitted by the up/down independent handover via wireless communication network NW1)

<Maximum Jitter Buffer Quantity at Time of the Bandwidth Complementing Handover>

Since simultaneous communication is performed via two wireless communication networks, the maximum jitter buffer when a real-time application is executed is obtained by adding, to delay time of any wireless communication network having relatively large delay, the difference in delay thereof. For example, according to the aforementioned definition, the delay time of wireless communication network NW1 and wireless communication network NW2 is DNW1 and DNW2, respectively, whereby the required maximum jitter buffer quantity is Max (DmNW1, DmNW2)+|DmNW1−DmNW2|. In a case in which the average delay time of wireless communication network NW2, to which handover is to be performed, cannot be measured, DNW2 is used instead of DmNW2. Specifically, the required maximum jitter buffer quantity is Max (DmNW1, DNW2)+|DmNW1−DNW2|.

<Handover System Selection Algorithm>

Figure 14:
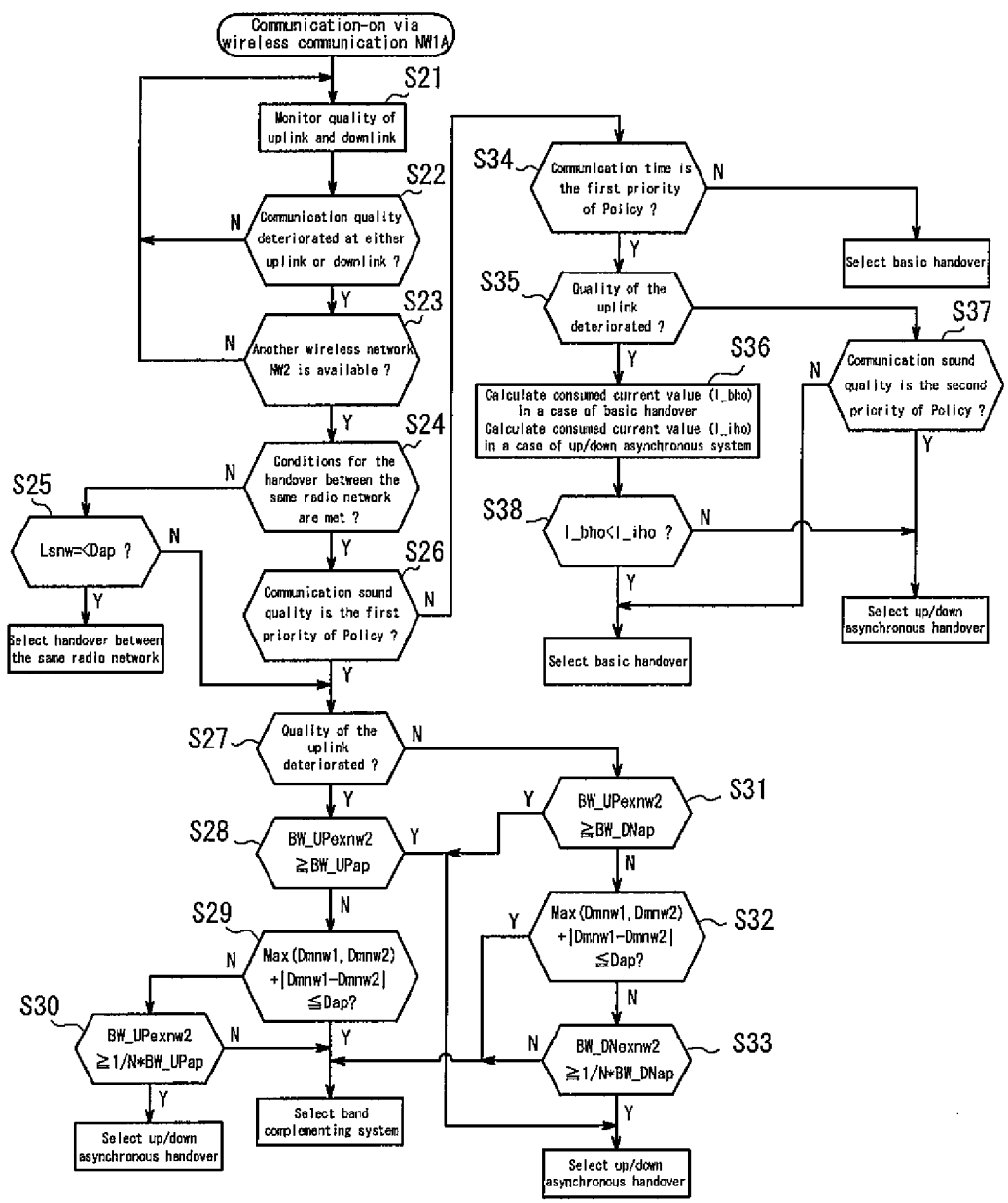
FIG. 14 is a flow chart showing an example of handover selection algorithm used in the wireless communication terminal according to the second embodiment of the present invention.
Figure 15:
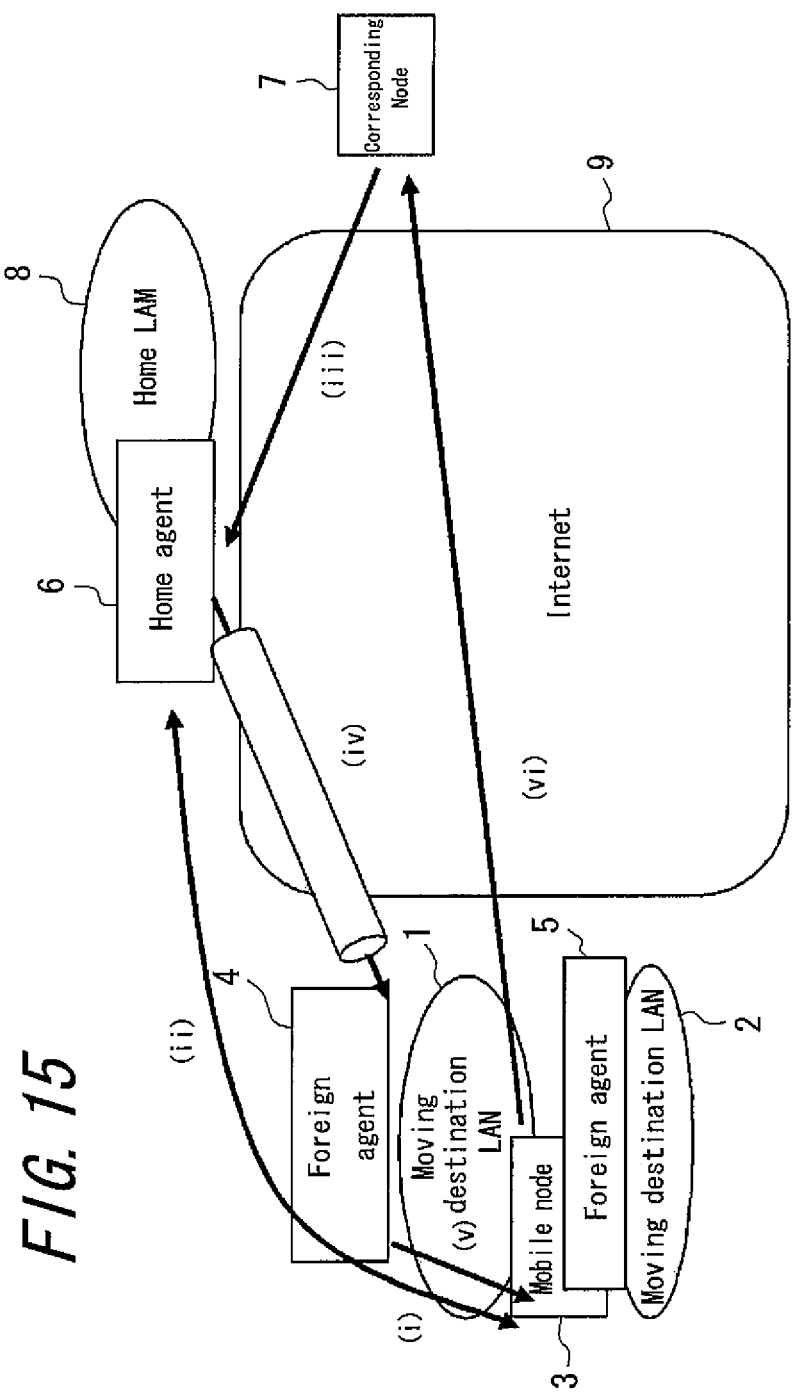
FIG. 15 is a diagram showing a system using mobile IP.
Figure 16:
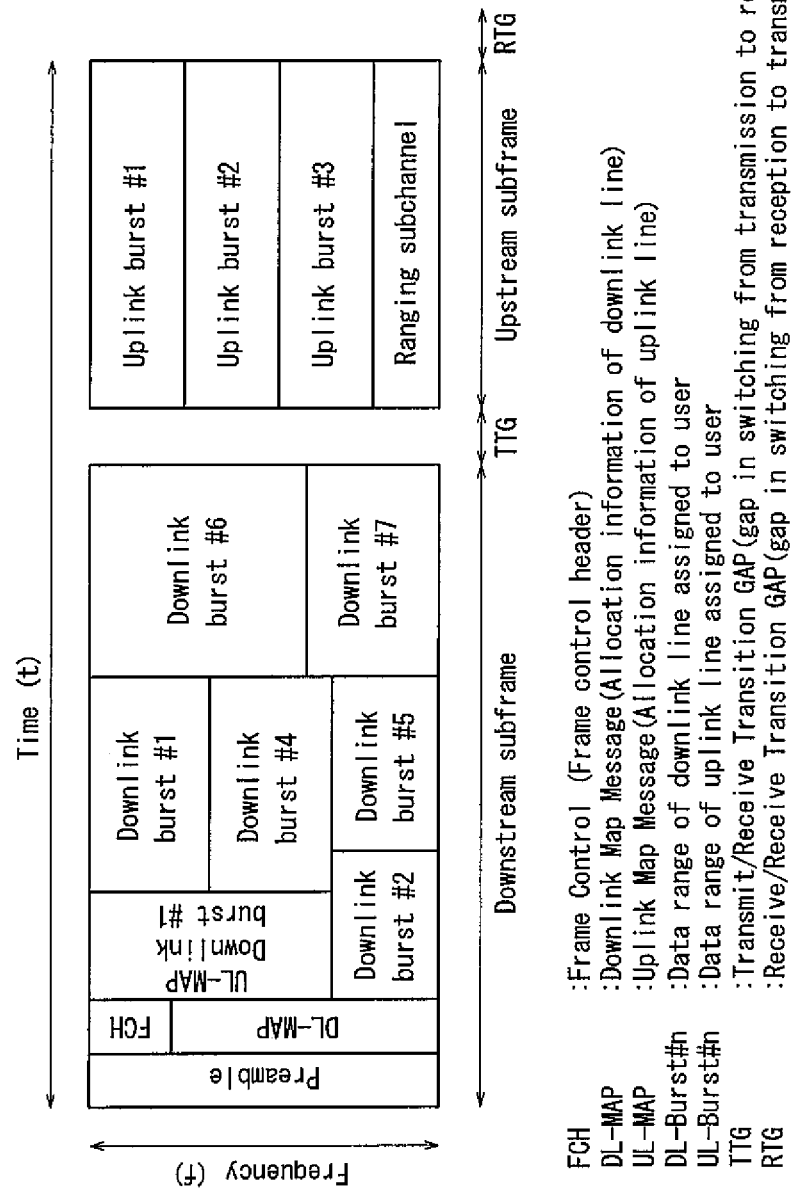
FIG. 16 is a diagram showing a WirelessMAN-OFDMA frame structure.

FIG. 14 is a flow chart showing an example of handover selection algorithm used in the wireless communication terminal according to the second embodiment of the present invention. First, it is assumed that the wireless communication terminal is in a communication-on state in wireless communication network NW1. At Step S21, the wireless communication terminal MN monitors the communication quality of the uplink and the downlink at a predetermined cycle. Regarding the downlink, it is judged that communication quality has been deteriorated when it is known that a certain threshold condition is met as a result of check using PER (packet error), CINR, RSSI or the like. Regarding the uplink, when a certain threshold value is no longer met due to variation in PER, delay, jitter or the like of IP packets in the switching server (SS), the wireless communication terminal is notified that the communication quality has been deteriorated. At Step S22, it is judged whether or not communication quality has been deteriorated in either the uplink or the downlink. In a case where communication quality has been deteriorated, Step S23 is executed, while in a case where communication quality has not been deteriorated, the procedure returns to Step S21.

At step 23, it is judged whether another wireless communication network NW2 is available or not. If another wireless communication network NW2 is available, Step S24 is executed, while if not, the procedure returns to Step S21. At Step 24, it is judged whether or not the conditions for the handover between (stations or sectors of) the same wireless network are met. If the conditions for the handover between the same wireless network are met, the procedure goes to Step S25. If not, Step S26 is executed. At Step S25, it is judged whether or not latency (Lsnw: a preset value) at the application level in the same wireless network handover is equal to or below the allowable delay (Dap) of the application which is being executed. If the judgment conditions are met, a handover between the same wireless network is executed. If not, Step S27 is executed.

At Step 26, it is judged whether or not the communication sound quality is the first priority among the preset Policies. If the judgment condition is met, Step S27 is executed, while it not, the procedure goes to Step S34. In Step 27, it is judged whether or not quality of the uplink of the vertical links has been deteriorated. When the quality of, the uplink has been deteriorated, Step S28 is executed. When the quality of the downlink has been deteriorated, Step S31 is executed. In Step 28, it is judged whether or not the uplink predicted average bandwidth (BW_UPexNW2) of the wireless communication network NW2 is equal to or exceeds the uplink required bandwidth (BW_UPap) of the application which is being executed. In a case where BW_UPexNW2≥BW_UPap, the up/down independent handover is selected and the procedure is completed. In a case where BW_UPexNW2<BW_UPap, Step S29 is executed.

In Step S29, it is judged whether or not the maximum delay at the time when an insufficient bandwidth is complemented by the wireless communication network NW2 and the wireless communication network NW1 is equal to or below the allowable delay (Dap) of the application which is being executed. In a case where the maximum delay is equal to or below Dap, a handover according to the bandwidth complementing system is performed. In a case where the maximum delay exceeds Dap, Step S30 is carried out. In Step S30, it is judged whether or not the uplink predicted average bandwidth (BW_UPexNW2) in the wireless communication network NW2 is equal to or exceeds 1/N of the uplink required bandwidth (BW_UPap) of the application. In a case where this judgment condition is met, the up/down independent handover is selected and the procedure is completed. In a case where the judgment condition is not met, the bandwidth complementing handover is selected and the procedure is completed.

In Step 31, it is judged whether or not the downlink predicted average bandwidth (BW_DNexNW2) in the wireless communication network NW2 is equal to or exceeds the downlink required bandwidth (BW_DNap) of the application which is being executed. In a case where BW_DNexNW2≥BW_DNPap, the up/down independent handover is selected and the procedure is completed. In a case where BW_DNexNW2<BW_DNap, the procedure proceeds to Step S32. In Step S32, it is judged whether or not the maximum delay at the time when an insufficient bandwidth is complemented by the wireless communication network NW2 and the wireless communication network NW1 is equal to or below the allowable delay (Dap) of the application which is being executed. In a case where the maximum delay is equal to or below Dap, a handover according to the bandwidth complementing system is performed. In a case where the maximum delay exceeds Dap, Step S33 is carried out. In Step S33, it is judged whether or not the downlink predicted average bandwidth (BW_DNexNW2) in the wireless communication network NW2 is equal to or exceeds 1/N of the downlink required bandwidth (BW_DNap) of the application. In a case where this judgment condition is met, the up/down independent handover is selected and the procedure is completed. In a case where the judgment condition is not met, the bandwidth complementing handover is selected and the procedure is completed.

In Step S34, it is judged whether or not communication (conversation) time has the first priority in the preset Policy. In a case where the judgment condition is met, the procedure proceeds to Step S35. In a case where the condition is not met, the basic handover is selected and the procedure is completed. In Step S35, it is judged whether or not the quality of the uplink of the vertical links has been deteriorated. When the quality of the uplink has been deteriorated, Step S36 is executed. When the quality of the downlink has been deteriorated, Step S37 is executed. In Step S36, a transmission current value (I_bho) when the basic handover is performed is calculated. Further, a transmission current value (I_Iho) when the up/down independent handover is performed is calculated and then Step S38 is carried out.

In Step 37, it is judged whether or not communication (conversation) quality has the second priority in the preset Policy. In a case where this judgment condition is met, the up/down independent handover is selected and the procedure is completed. In a case where the judgment condition is not met, the basic handover is selected and the procedure is completed. In Step 38, it is judged whether or not the transmission current value (I_bho) when the basic handover is performed is smaller than the transmission current value (I_Iho) when the up/down independent handover is performed. In a case where this judgment condition is met, the basic handover is selected and the procedure is completed. In a case where the judgment condition is not met, the up/down independent handover is selected and the procedure is completed.

The wireless communication terminal (MN) can set in advance, as network selection policy/preference information, preference either on communication quality or on conversation (communication) time, i.e. on battery saving, or conversation (communication) charge. That is, the wireless communication terminal (MN) has a user interface by which a user can select what is called "policy/preference" (selection criterion), of which examples include preference to realize a bandwidth which is the most suitable to the application on the signal reception side, preference to select the cheapest charge, and the like.

Regarding the user interface (the operation inputting unit), selection may be performed by using software keys on a display or inputted in advance with hardware keys.

TABLE 6

Policy (preference) selection
Selection of Policy regarding handover (network selection)
of wireless communication networks 1) Preference on communication quality
2) Preference on communication time (preference on battery saving)
3) Preference on communication charge The aforementioned four handover systems are expressed as systems (1)-(4) below, and explanation will be made regarding which handover system is preferentially selected in a specific network structure.

System (1): Vertical synchronization system

System (2): Up/down asynchronous system

System (3): Synchronization connection bandwidth complementary system

System (4): Switching systems in the same network

TABLE 7

|  | Currently using WiMAX | Preference order |
|---|---|---|
| Policy: Selection of preference on Communication quality | System (2): Up/down asynchronous system | High ↑ |
|  | System (3): Synchronization connection bandwidth complementary system | Preference order ↑ |
|  | System (1): Vertical synchronization system | Low |

In a case where "Preference on communication quality" is set as policy information and "WiMAX" is used as a network as shown in Table 7, a handover system is selected in the preference order of System (2), System (3) and System (1). Specifically, the wireless communication terminal of the present invention first judges whether the handover system (2), having the highest preference order, can be performed or not. In a case where System (2) can be performed, System (2) is selected. If not, it is judged one by one whether the subsequent systems in the preference order can be performed or not and the system which is judged to be performable is selected. In the case of putting preference on communication quality, WiMAX is preferably not included to selection candidates because WiMAX tends to generate voice break or the like of relatively large magnitude in a handover within the same network.

TABLE 8

|  | Currently using EVDO | Preference order |
|---|---|---|
| Policy: Selection of preference on Communication quality | System (4): Switching systems in the same network | High ↑ |
|  | System (2): Up/down asynchronous system | ↑ |
|  | System (3): Synchronization connection bandwidth complementary system | Preference order ↑ |
|  | System (1): Vertical synchronization system | Low |

In a case where "Preference on communication quality" is set as policy information and "EVDO" is used as a network as shown in Table 8, a handover system is selected in the preference order of System (4), System (2), System (3) and System (1). Specifically, the wireless communication terminal of the present invention first judges whether the handover system (4), having the highest preference order, can be performed or not. In a case where System (4) can be performed, handover is performed according to System (4). If not, it is judged one by one whether the subsequent systems in the preference order can be performed or not and the system which is judged to be performable is selected.

TABLE 9

|  | Currently using WiMAX | Preference order |
|---|---|---|
| Policy: Selection of preference on Communication time | System (1) or System (2) | High ↑ |
|  | System (4): Switching systems in the same network |  |
|  | System (3): Synchronization connection bandwidth complementary system | Preference order ↑ Low |

In a case where "Preference on communication time" is set as policy information and "WiMAX" is used as a network as shown in Table 9, a handover system is selected in the preference order as shown in Table 9.

TABLE 10

|  | Currently using EVDO | Preference order |
|---|---|---|
| Policy: Selection of preference on Communication time | System (4): Switching systems in the same network | High ↑ |
|  | System (2) or System (1) | ↑ |
|  | System (3): Synchronization connection bandwidth complementary system | Preference order ↑ Low |

In a case where "Preference on communication time" is set as policy information and "EVDO" is used as a network as shown in Table 10, a handover system is selected in the preference order as shown in Table 10;

As described above, according to the second embodiment, in a network environment connectable to plural networks, the most suitable system of the plural types of handover systems can be automatically selected depending on the circumstance, to perform a handover.

The present invention has been described on the basis of the drawings and the embodiments. However, it should be noted that various changes and modifications based on the disclosure of the present invention will be apparent to one skilled in the art and thus these changes and modifications will be within the scope of the present invention. For example, each unit, functions included in each step and the like can be rearranged unless the rearrangement is logically contradictory. Specifically, plural units or steps may be combined to one or one unit or step may be divided to two more. In each of the aforementioned embodiments, three communication cards are used to support three wireless communication networks, respectively. However, the wireless communication apparatus of the present invention is not restricted to these embodiments and examples thereof include a wireless communication apparatus where plural wireless communication networks is supported by one communication card and a wireless communication apparatus having a function installed therein to communicate with plural wireless communication networks. Further, although FIG. 14 is based on conditions that another wireless communication network is available, a handover (basic handover) by the same wireless communication network may of course be selected in a case where another wireless communication network is not available.

The invention claimed is:

1. A wireless communication apparatus connectable to plural wireless communication networks, comprising:
a handover system selection unit for selecting one of
a vertical synchronization system for performing simultaneous handover of vertical links, an up/down asynchronous system for performing asynchronous handover of the vertical links, a synchronization connection bandwidth complementary system for simultaneously connecting a terminal, while maintaining connection with one wireless communication network currently in use for communication, to another wireless communication network, and performing handover to the another wireless communication network so that an insufficient bandwidth is complemented, and an in-the-same-network switching system for performing handover from a base station or sector currently in use for connection to another base station or sector in the same wireless communication network;

a handover control unit for controllably performing handover by using the handover system selected by the handover system selection unit;

a latency storing unit for storing latency required for handover in each wireless communication network of the plural wireless communication networks, and allowable delay time prescribed for each application to be used for communication; and a time comparing unit for comparing latency stored in the latency storing unit with allowable delay time of an application in use for communication, wherein the handover system selection unit selects one of the handover systems on the basis of the comparison results by the time comparing unit with regard to whether or not the latency exceeds the allowable delay time.

2. A wireless communication apparatus connectable to plural wireless communication networks, comprising:

a handover system selection unit for selecting one of a vertical synchronization system for performing simultaneous handover of vertical links, an up/down asynchronous system for performing asynchronous handover of the vertical links, a synchronization connection bandwidth complementary system for simultaneously connecting a terminal, while maintaining connection with one wireless communication network currently in use for communication, to another wireless communication network, and performing handover to the another wireless communication network so that an insufficient bandwidth is complemented, and an in-the-same-network switching system for performing handover from a base station or sector currently in use for connection to another base station or sector in the same wireless communication network;

a handover control unit for controllably performing handover by using the handover system selected by the handover system selection unit;

a delay time measuring unit for measuring average delay time in a wireless communication network currently in use for communication;

a handover counterpart side delay time acquisition unit for acquiring average delay time in another wireless communication network as a candidate of a handover counterpart side;

time difference calculating unit for calculating difference in time between the average delay time measured by the delay time measuring unit and the average delay time acquired by the handover counterpart side delay time acquisition unit; and a comparison unit for comparing a time interval obtained by adding the larger average delay time of either the wireless communication network currently in use for communication or another wireless communication network as a candidate of the handover counterpart side, to the time difference calculated by the time difference calculating unit, with an allowable delay time of an application, wherein the handover system selection unit determines, in accordance with a comparison result obtained by the comparison unit, whether the synchronization connection bandwidth complementary system is to be selected or one of the other three systems to be selected.

3. A wireless communication apparatus connectable to plural wireless communication networks, comprising:

a handover system selection unit for selecting one of a vertical synchronization system for performing simultaneous handover of vertical links, an up/down asynchronous system for performing asynchronous handover of the vertical links, a synchronization connection bandwidth complementary system for simultaneously connecting a terminal, while maintaining connection with one wireless communication network currently in use for communication, to another wireless communication network, and performing handover to the another wireless communication network so that an insufficient bandwidth is complemented, and an in-the-same-network switching system for performing handover from a base station or sector currently in use for connection to another base station or sector in the same wireless communication network;

a handover control unit for controllably performing handover by using the handover system selected by the handover system selection unit; and a consumed electric current value calculating unit for calculating for each wireless communication network a consumed electric current value consumed by communication at each wireless communication network, wherein the handover system selection unit selects one of the handover systems on the basis of each consumed electric current value calculated by the consumed electric current value calculating unit, and the consumed electric current value calculating unit calculates a consumed electric current value consumed during transmission on the basis of at least transmission output and a transmission bandwidth.

* * * * *